No. 754,940. PATENTED MAR. 15, 1904.
J. G. & M. O. REHFUSS.
CAN MAKING MACHINE.
APPLICATION FILED APR. 26, 1902.
NO MODEL. 17 SHEETS—SHEET 1.
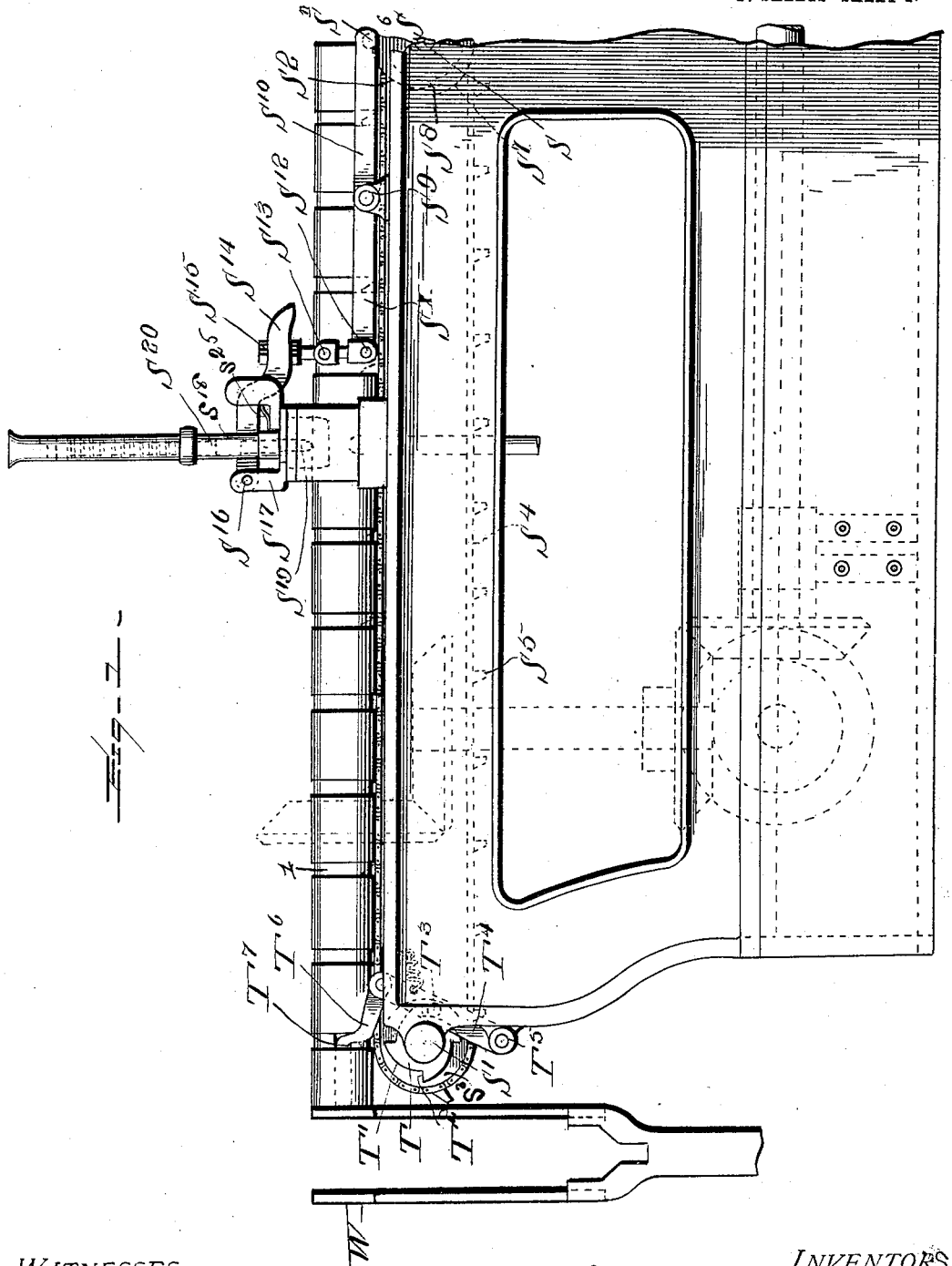
WITNESSES:
Wm H Doyle
A. L. Hough
INVENTORS
J. G. Rehfuss and M. O. Rehfuss,
BY Franklin H. Hough
Attorney

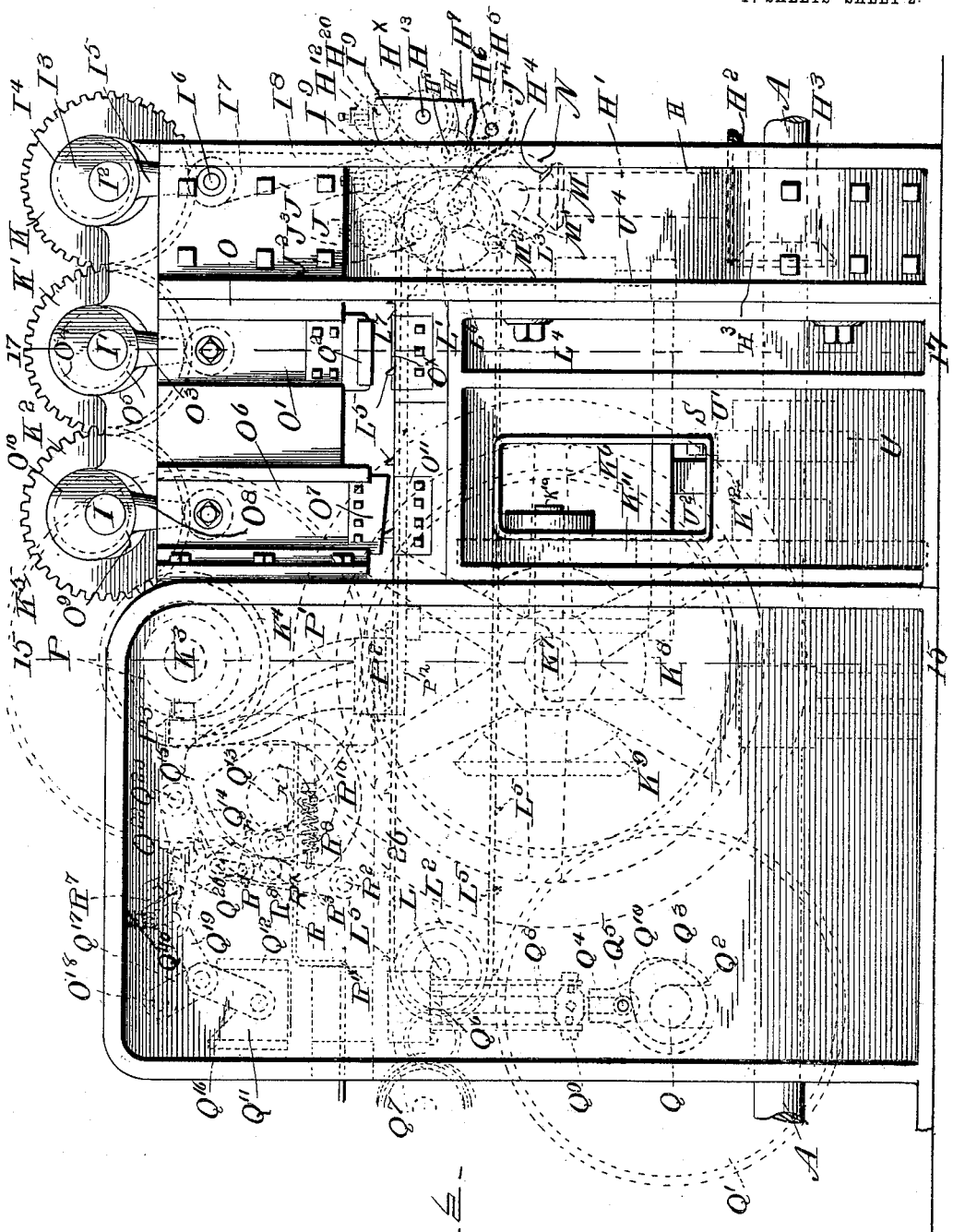

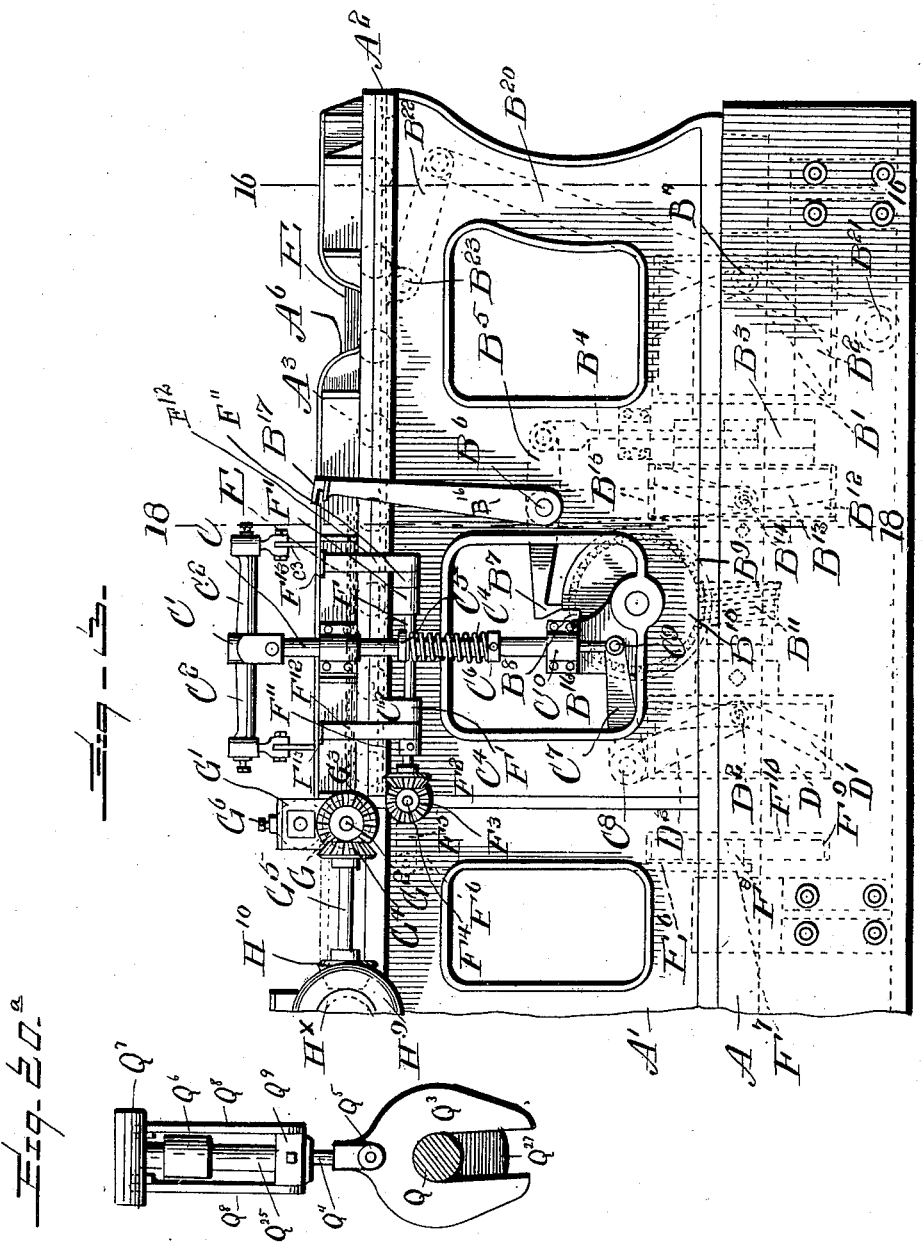

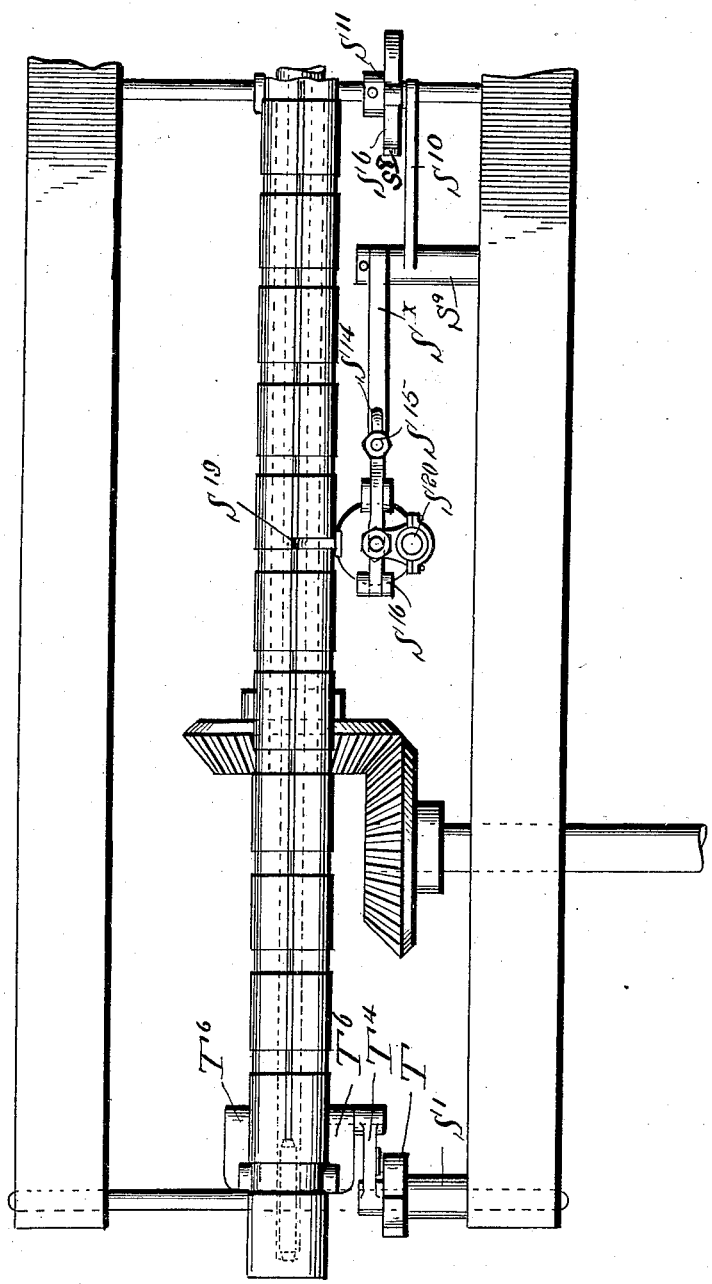

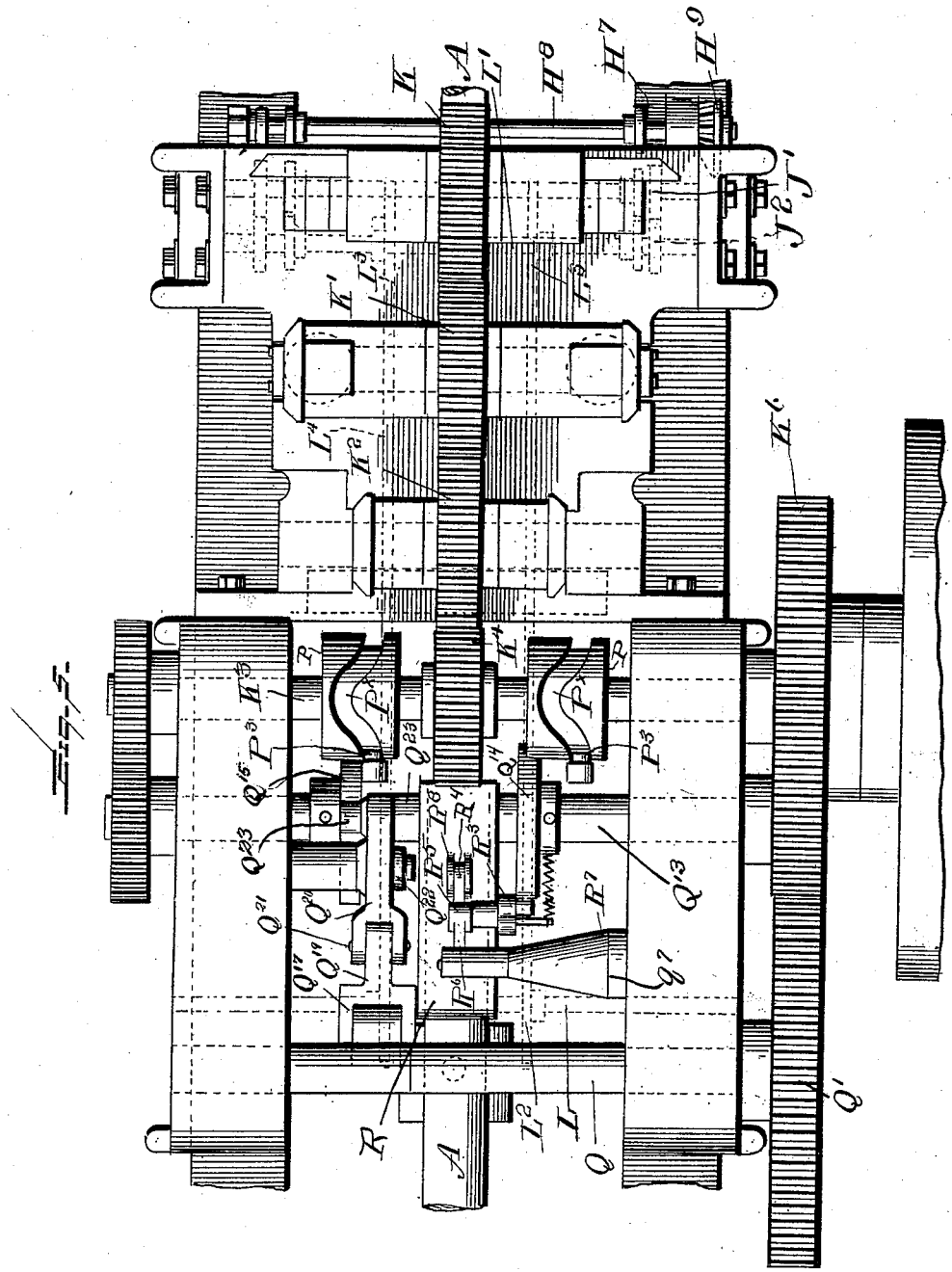

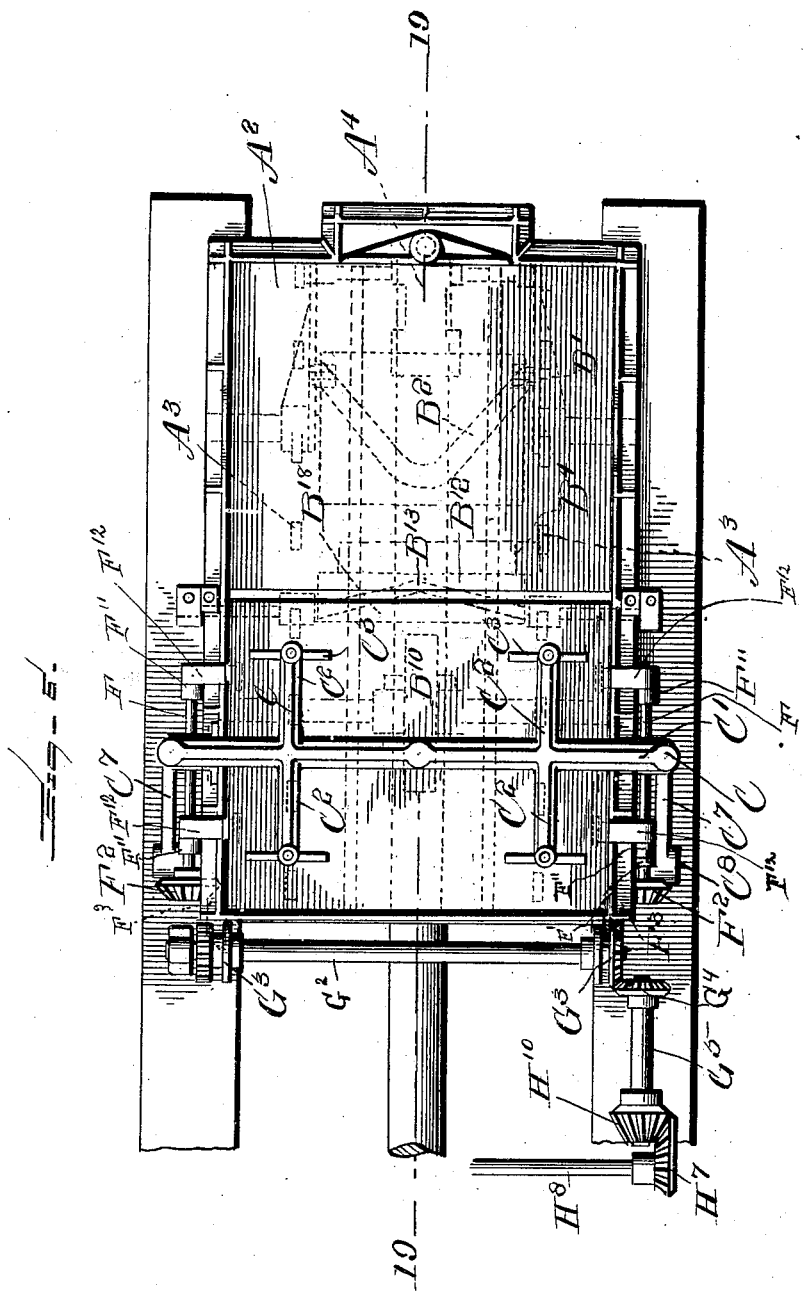

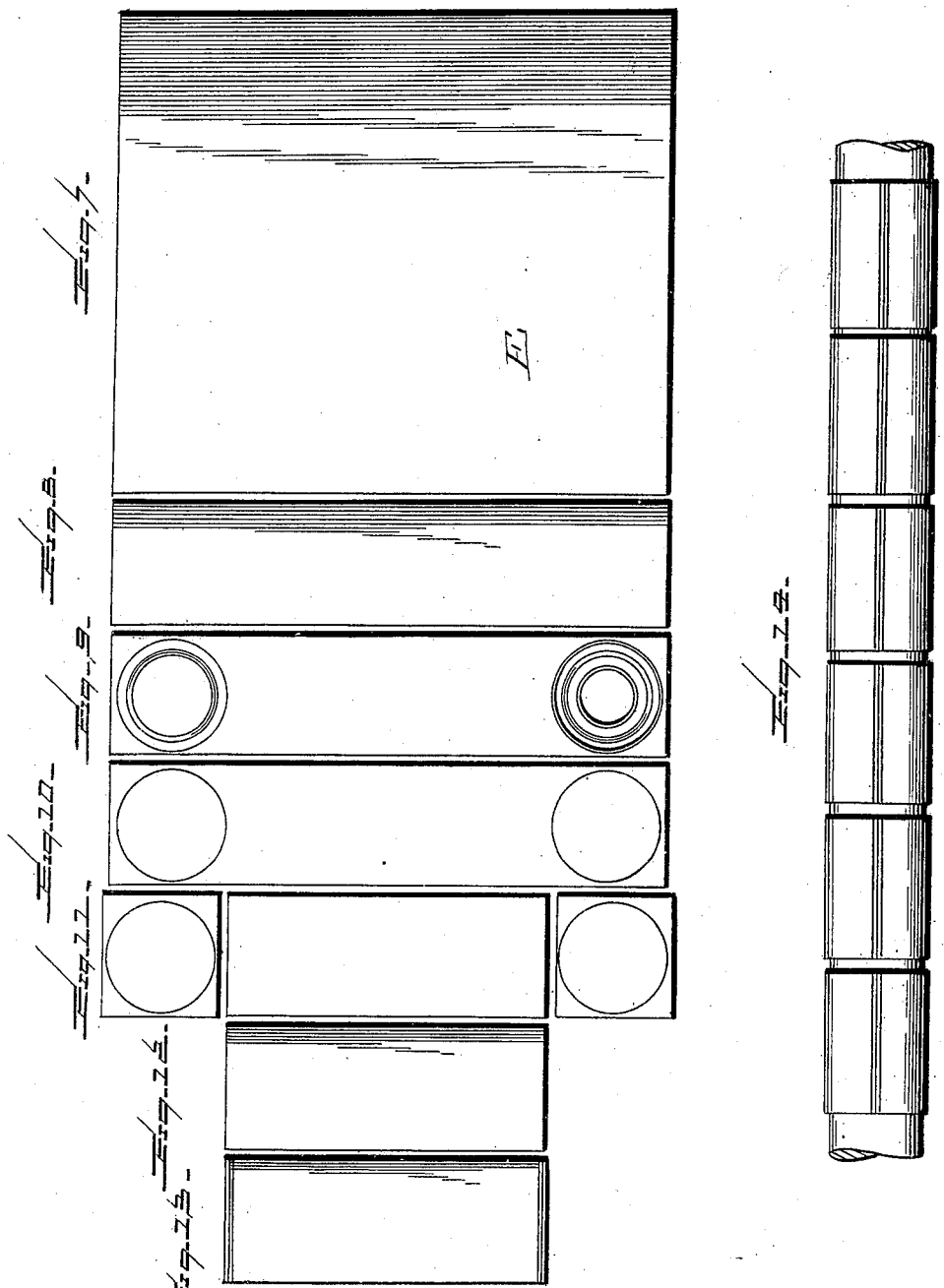

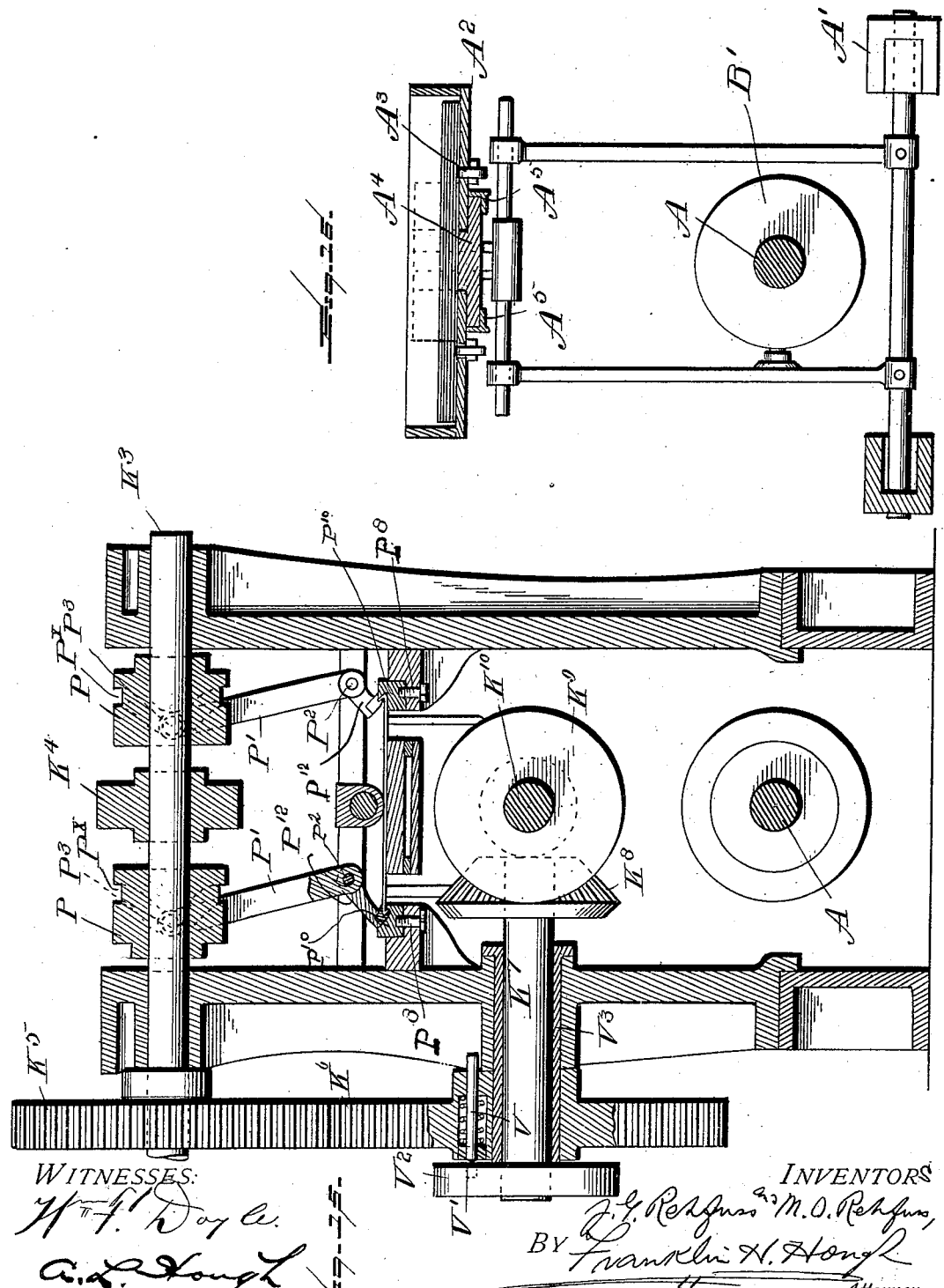

No. 754,940. PATENTED MAR. 15, 1904.
J. G. & M. O. REHFUSS.
CAN MAKING MACHINE.
APPLICATION FILED APR. 26, 1902.
NO MODEL. 17 SHEETS—SHEET 9.
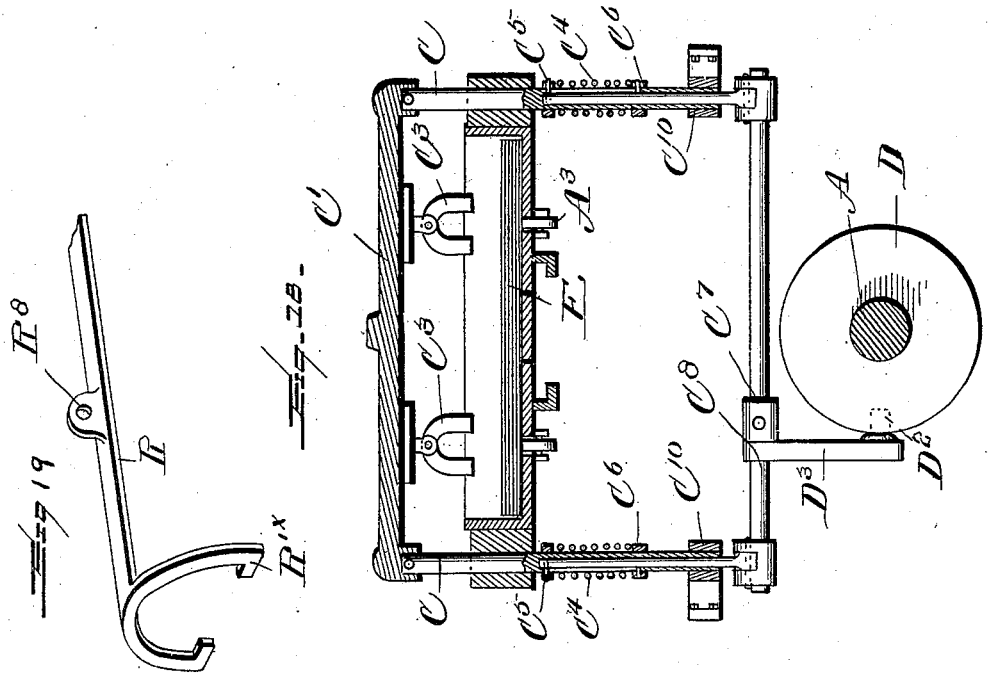
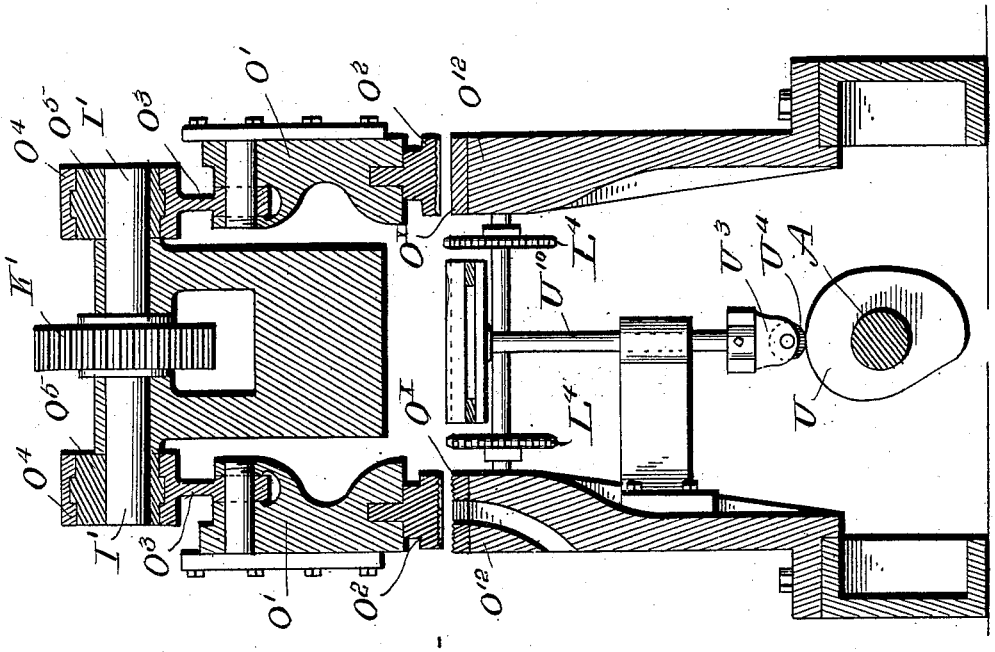
WITNESSES: INVENTORS
Wm. F. Doyle J. G. Rehfuss, M. O. Rehfuss,
A. L. Hough By Franklin H. Hough
Attorney

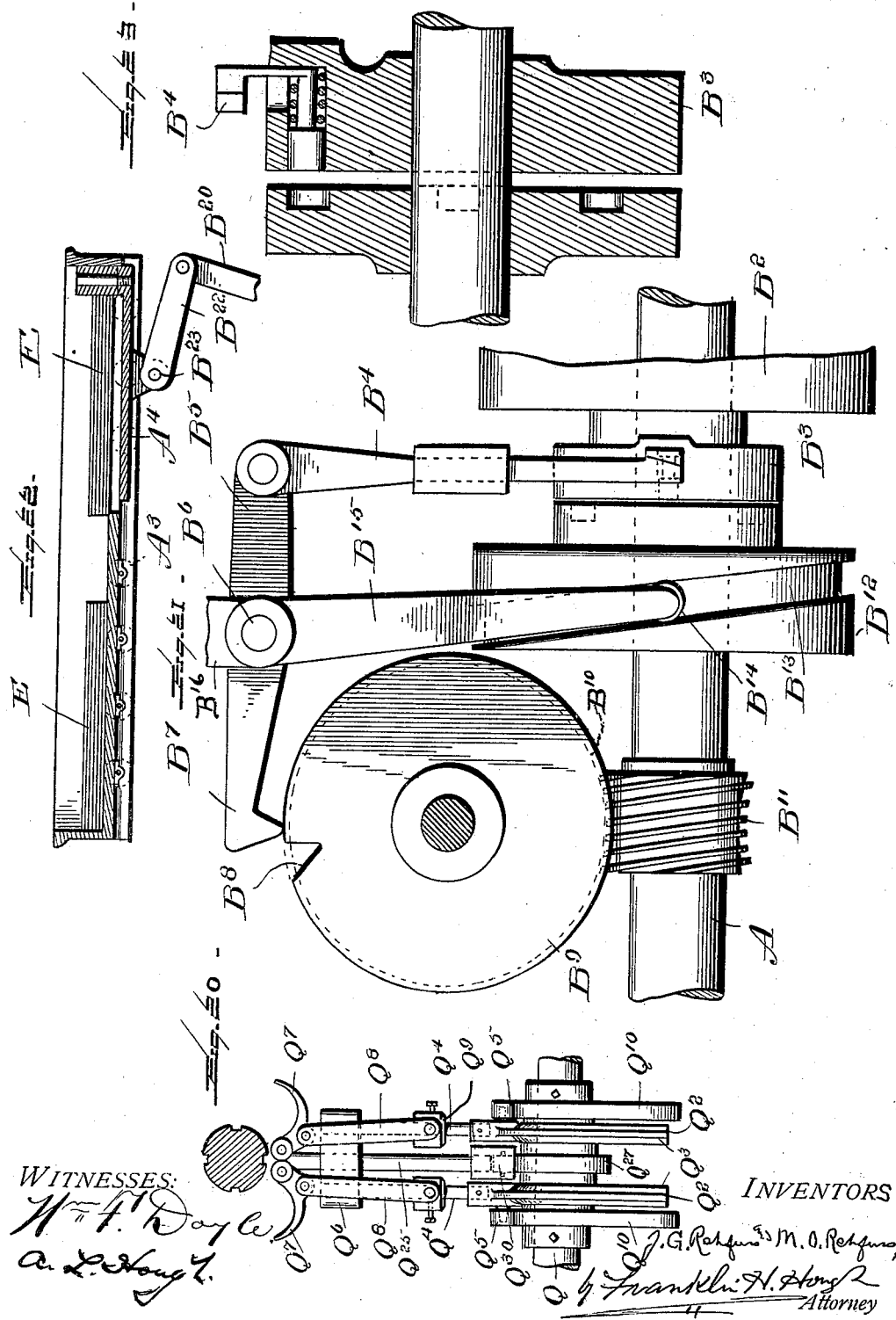

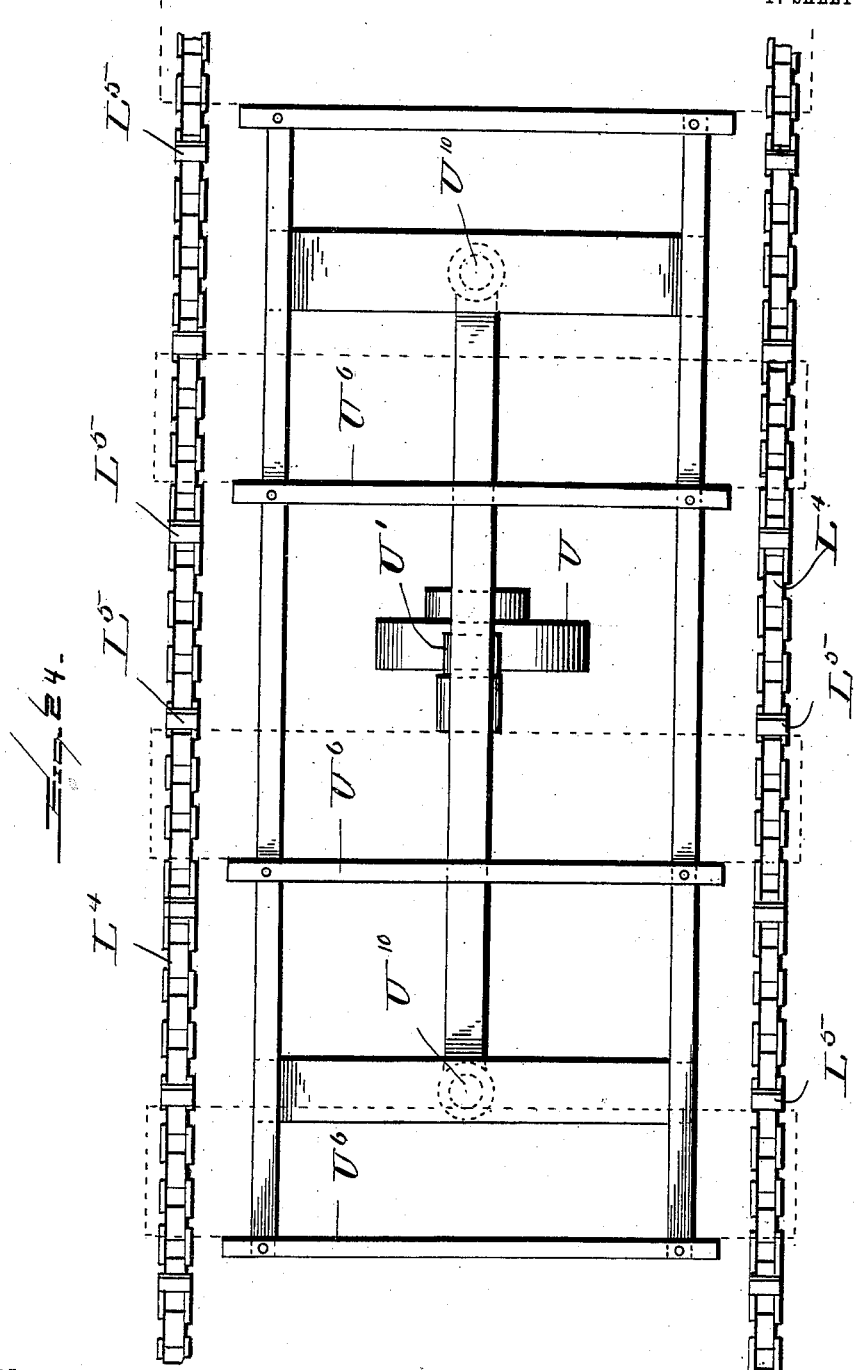

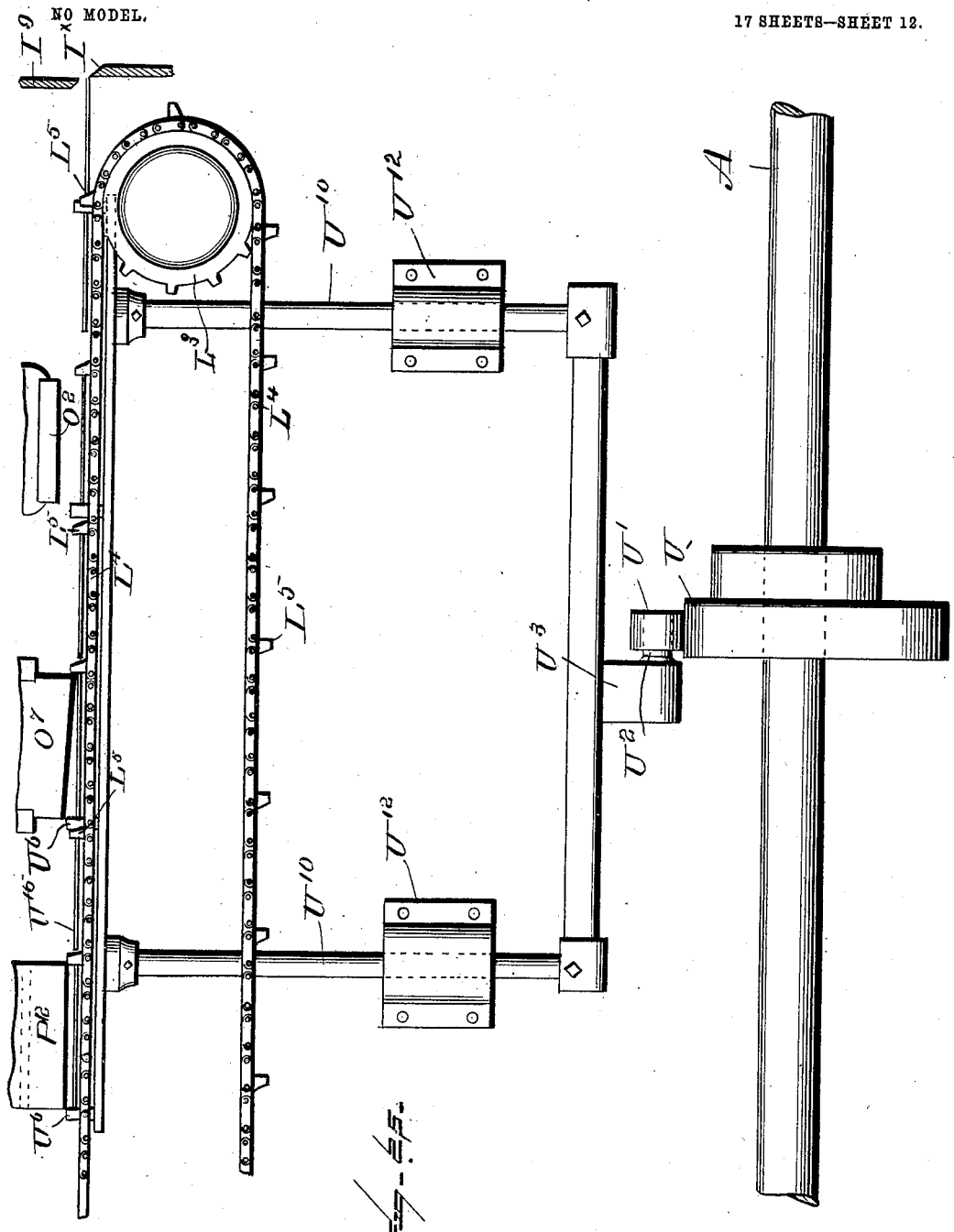

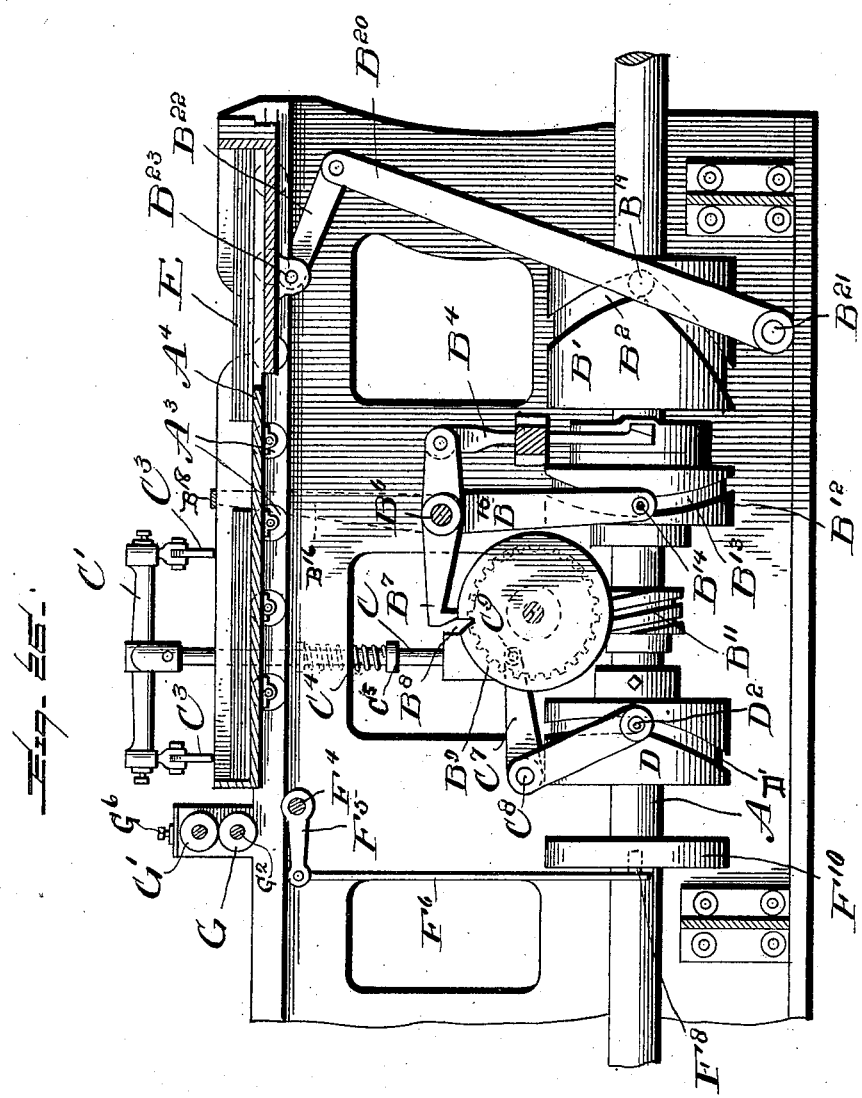

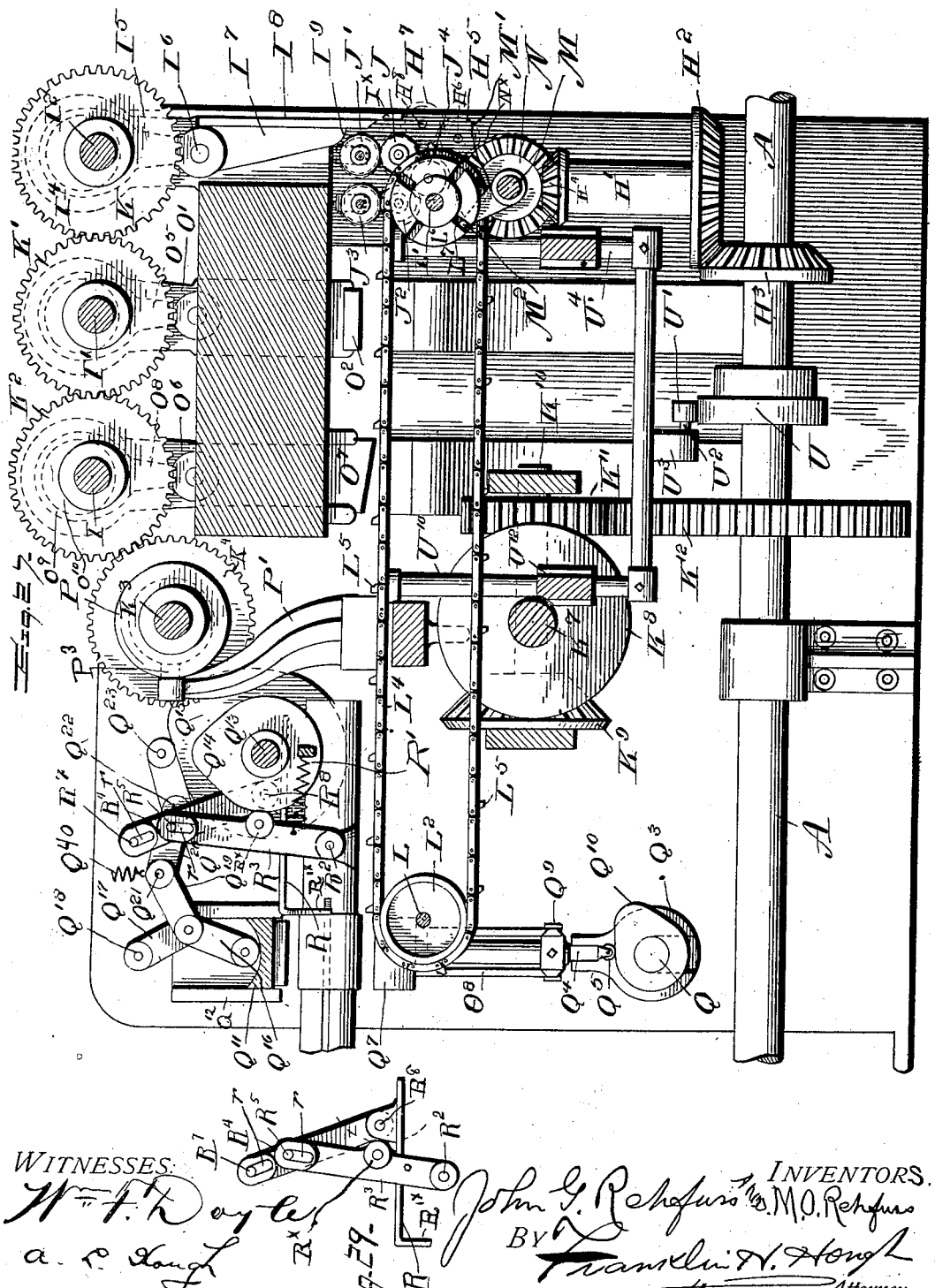

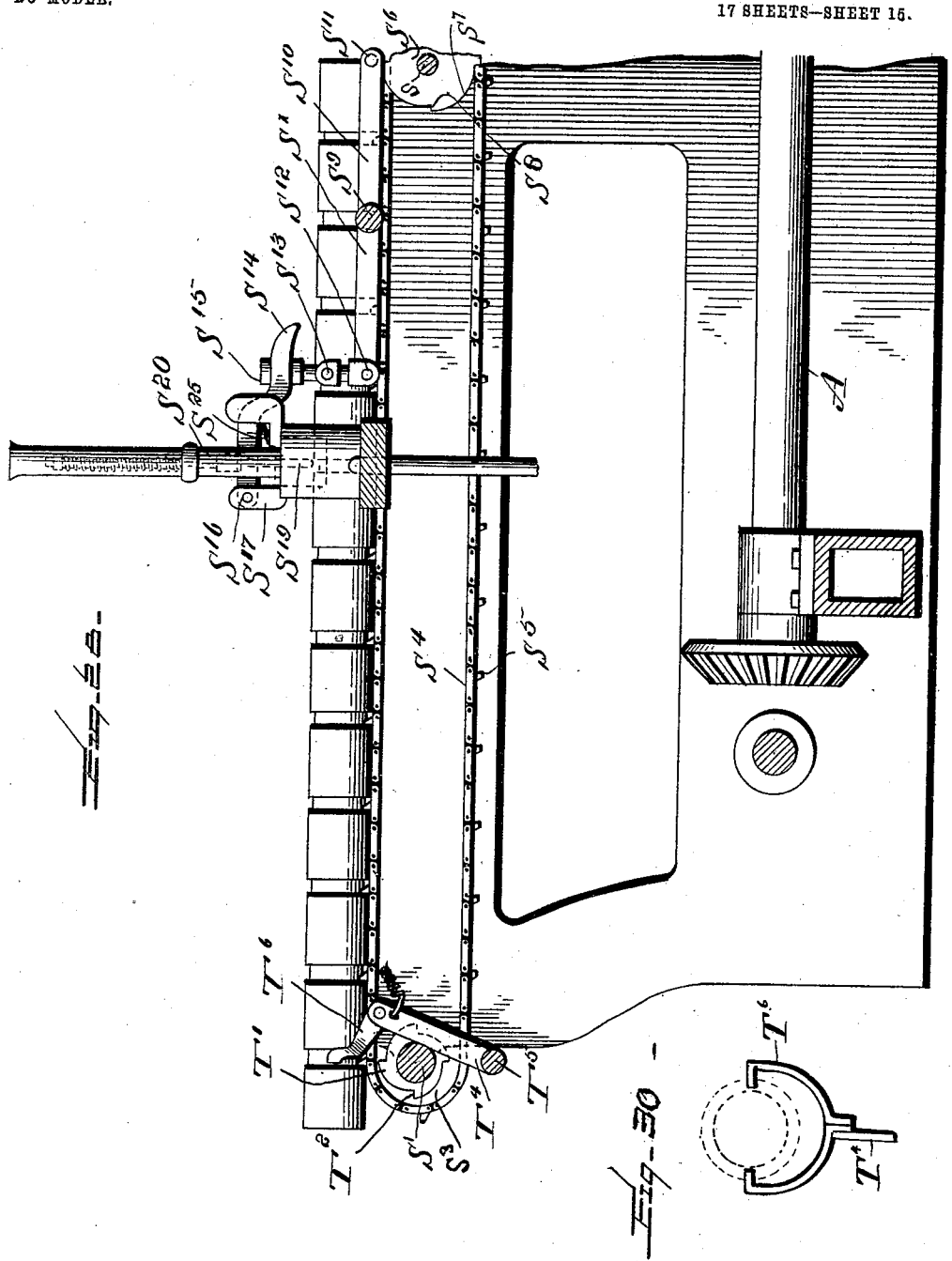

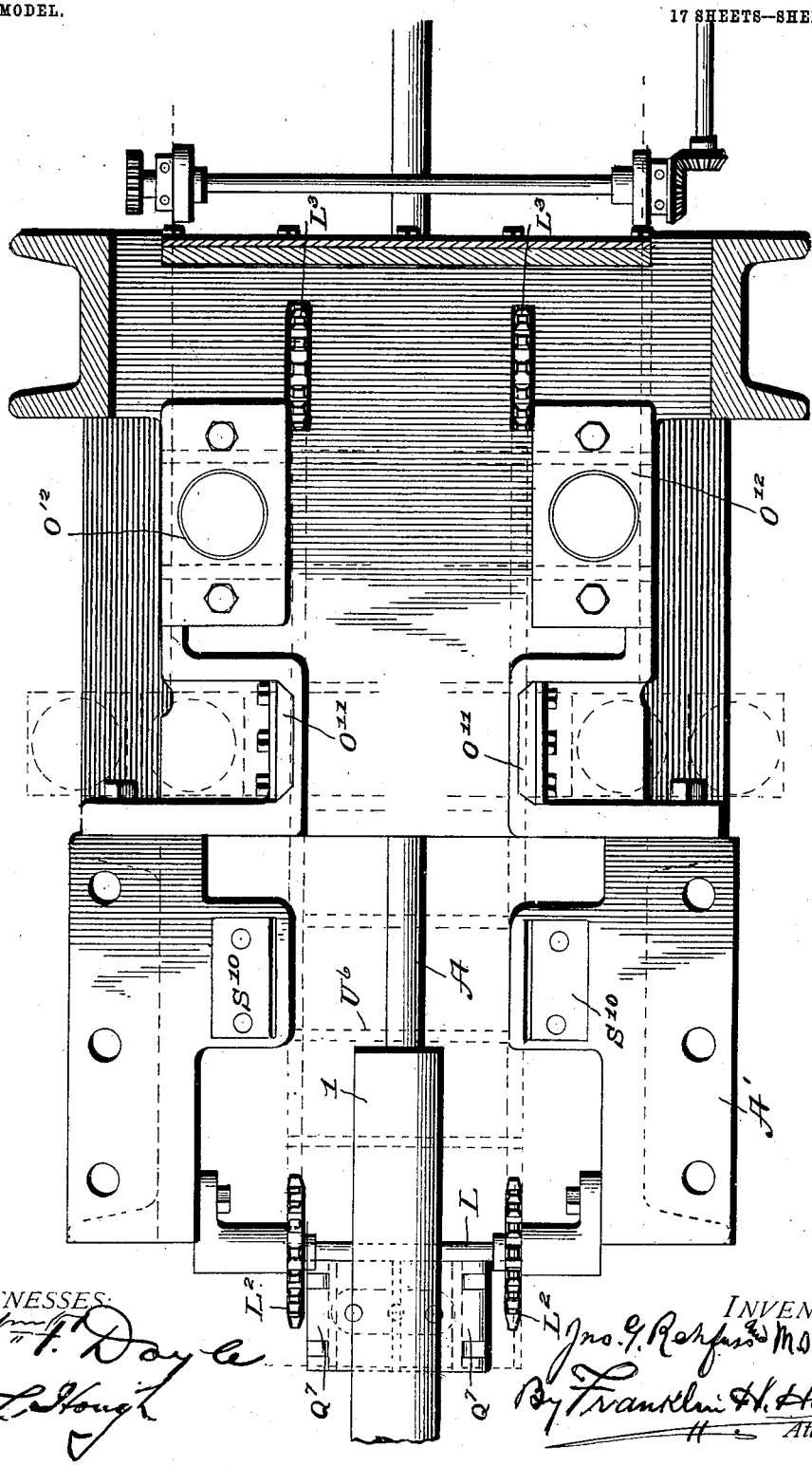

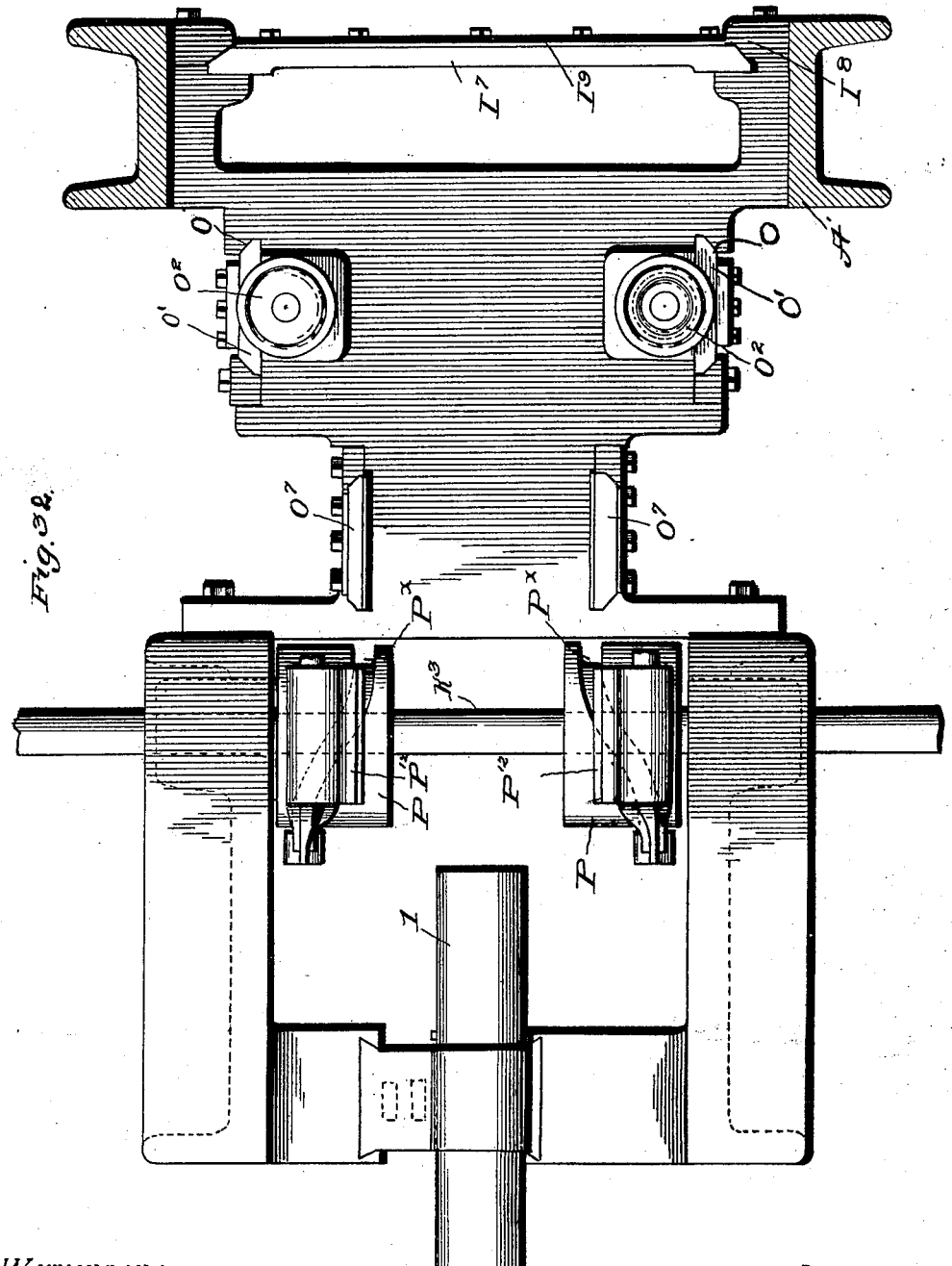

No. 754,940. Patented March 15, 1904.

UNITED STATES PATENT OFFICE.

JOHN G. REHFUSS AND MARTIN O. REHFUSS, OF PHILADELPHIA, PENNSYLVANIA.

CAN-MAKING MACHINE.

SPECIFICATION forming part of Letters Patent No. 754,940, dated March 15, 1904.

Application filed April 26, 1902. Serial No. 104,870. (No model.)

*To all whom it may concern:*

Be it known that we, JOHN G. REHFUSS and MARTIN O. REHFUSS, citizens of the United States, residing at Philadelphia, in the county of Philadelphia and State of Pennsylvania, have invented certain new and useful Improvements in Can-Making Machines; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in can-making machines; and it consists in the provision of means whereby sheets of tin are automatically fed into the machine, said sheets being cut into strips each the width of the length of the body portion of a can, after which the tops and bottoms are automatically stamped out of the end pieces of the strips, then the waste ends of the strips from which the tops and bottoms are cut being cut off, and afterward the ends of the strips are crimped to form the ends, which are afterward interlocked, forming a seam, and in the provision of means whereby the crimped strips are turned about the former and their ends interlocked, clenched, and thence fed to another part of the machine, where the seams are automatically soldered preparatory to their being carried to another part of the machine, where the tops and bottoms are automatically applied to the body portions of the cans by apparatus which is shown and described in our former application, Serial No. 97,907, filed March 12, 1902.

The invention consists, further, in various details of construction and combinations of parts, as will be hereinafter fully described and then specifically defined in the appended claims.

Our invention is illustrated in the accompanying drawings, which, with the letters of reference marked thereon, form a part of this application, and in which drawings—

Figure 1 is a side elevation of a portion of our improved apparatus for making the body portions of cans and tops and bottoms therefor. Fig. 2 is a side elevation of a portion of the machine which is continuous with the form of mechanism illustrated in Fig. 1; and Fig. 3 is also a side elevation of a portion of the machine which is continuous with Fig. 2, the three views, Figs. 1, 2, and 3, taken together, showing the entire side elevation of our mechanism for making the body portion of a can and the tops and bottoms therefor. Fig. 4 is a top plan view of the portion of the machine illustrated in Fig. 1. Fig. 5 is a top plan view of the portion of the machine illustrated in Fig. 2; and Fig. 6 is a top plan view of the part of the machine illustrated in elevation in Fig. 3, said Figs. 4, 5, and 6, when taken together, illustrating a complete top plan view of the mechanism. Fig. 7 is a view showing a portion of a sheet of tin from which strips have been cut to form the body portions of the cans. Fig. 8 designates one of the strips. Fig. 9 is a view showing the top and bottom cut from the ends of one of said strips, said top and bottom being shown as having been severed from the strips, leaving round apertures in the ends of the strips. Fig. 10 is a detail view of the strips after the tops and bottoms have been removed. Fig. 11 shows a strip with the waste ends severed. Fig. 12 is a view of the strip preparatory to having its ends crimped to be interlocked. Fig. 13 is a view of the strip with its ends crimped ready to be turned about a former to have its ends interlocked. Fig. 14 is the former about which the strips of tin are bent to interlock their crimped edges and upon which the body portions after being interlocked are clenched and soldered. Fig. 15 is a sectional view on line 15 15 of Fig. 2. Fig. 16 is a sectional view on line 16 16 of Fig. 3. Fig. 17 is a sectional view taken on line 17 17 of Fig. 2. Fig. 18 is a sectional view taken on line 18 18 of Fig. 3. Fig. 19 is a detail view in perspective of the member for feeding the body portions of the cans forward on the former. Fig. 20 is a cross-sectional view through the former, showing in side elevation the means for turning the strip of tin about the former. Fig. 20$^a$ is a sectional detail showing parts of Fig. 20 in elevation.

Fig. 21 is a detail view, in side elevation, of the clutch mechanism and means for operating the same, whereby a pile of tin is fed forward to a position where the sheets are raised singly. Fig. 22 is a longitudinal section centrally through the receptacle for holding the pile of tin and the carriage on which the pile is fed forward. Fig. 23 is a vertical sectional view through the clutch mechanism. Fig. 24 is a top plan view of a portion of the machine, showing the guide mechanism for holding the strips, while the tops and bottoms for the cans are punched therefrom and the strips sheared; and Fig. 25 is a side elevation of the mechanism illustrated in Fig. 24, showing the means for holding the strips truly while being operated upon. Figs. 26, 27, and 28 are views which when taken together form a continuous side elevation of the apparatus embodied in the present application, portions being shown in section and parts of the frame of the machine not being shown in order to better illustrate the operative features of the apparatus. Fig. 29 is a detail view showing the levers for pushing the can-bodies on the former. Fig. 30 is a detail of the member for pushing the can-bodies off the end of the former. Fig. 31 is a horizontal sectional view looking down upon the table of the machine and showing the manner in which the waste ends of the strips are disposed of and showing the positions of the dies and the crimping members with relation to other parts of the machine. Fig. 32 is a sectional view looking upward, taken in the same plane.

Reference now being had to the details of the drawings by letter, A designates the main operating-shaft of the mechanism, which may be driven from any source of power and is suitably journaled in bearings. Mounted on the upright portion of frame $A'$ is a table $A^2$, and journaled in suitable bearings in apertures at intervals along said table are antifriction-wheels $A^3$, which are stationary, and $A^4$ designates a slide or carriage adapted to rest upon and work longitudinally and horizontally on shoulders $A^5$ of the table, and on said carriage a pile of sheets of tin is adapted to be placed at the cut-away portion $A^6$. The upper ends of said antifriction-wheels $A^3$ project a slight distance above the upper surface of the table and the slide or carriage for the purpose of relieving the carriage of a portion of the weight of the pile of tin, and consequently minimizing the amount of friction between the pile of tin and the table.

Mounted loosely upon the shaft A is a wheel $B'$, to which a clutch-wheel $B^3$ is connected, said wheel $B'$ having a cam-groove $B^2$ in its circumference, in which an antifriction-roller $B^{19}$ travels, which antifriction-roller is carried by the lever $B^{20}$, which is pivoted at $B^{21}$ to the frame and also to a link $B^{22}$, which in turn is pivoted at $B^{23}$ to a bracket integral with the carriage or slide $A^4$. (Clearly shown in Figs. 3 and 23.) Said clutch-wheel is adapted to be normally idle, excepting at each rotary movement of a worm-wheel $B^{10}$, at which time clutch mechanism is actuated so as to cause the wheel $B^3$ to make a complete rotary movement, for a purpose which will presently appear.

$B^4$ designates a clutch-operating arm which is operated by means of the oscillating lever $B^5$ for the purpose of throwing the clutch mechanism into or out of engagement with the clutch-wheel, accordingly as it is desired to cause the wheel $B'$ with the cam-groove therein to rotate or remain stationary. Said lever $B^5$ is journaled on a shaft $B^6$, mounted in the frame of the machine, and one end is hooked, as at $B^7$, and is designed to fall into the notch $B^8$ in the circumference of the wheel $B^9$ each time the latter makes a complete revolution. Mounted to rotate with said wheel $B^9$ is a gear-wheel $B^{10}$, having a series of teeth about its circumference, preferably one hundred, so that one hundred sheets of tin may be fed forward before a new pile is brought forward to locations to be underneath mechanism whereby the sheets are picked up singly. A worm $B^{11}$ is mounted to rotate with the main operating-shaft and is in mesh with the teeth of said wheel $B^{10}$. A wheel $B^{12}$ is mounted to rotate with the shaft A and has a cam-groove $B^{13}$ about its circumference, in which the antifriction-roller $B^{14}$ travels, which antifriction-roller is mounted on a stub-shaft adjacent to the lower end of the arm $B^{15}$, which is fixed to the shaft $B^6$, whereby said arm $B^{15}$ at each rotary movement of the operating-shaft will cause the shaft $B^6$, to which it is fastened, and also the arms $B^{16}$, to rock, said arms $B^{16}$ being fixed to the shaft $B^6$. The pushing-fingers $B^{17}$, which are fastened to a cross-piece $B^{18}$, Fig. 6, which are mounted on the ends of the arms $B^{16}$, will cause the sheet to be fed forward after the latter has been raised to a suitable position to be fed forward by means which will be hereinafter described, and said fingers will be returned to their starting position.

Mounted to have a vertical movement in suitable boxings on the opposite sides of the frame of the machine are reciprocating rods or bars C, which are connected at their upper ends to a cross-piece $C'$, which has laterally-projecting bars $C^2$, each of which at its ends is provided with a suction-cup or magnet $C^3$, which are adapted as said strips are thrown into contact with a sheet of tin to raise a sheet from the pile of tin and hold the same suspended until it is pushed forward by said feeding-fingers. A spring $C^4$ is interposed between a stationary collar $C^5$ and a collar $C^6$, which is fastened to the rod C, which is provided for the purpose of holding the cups or magnets for raising the sheets of tin normally against the pile of sheets of tin which have been previously fed forward to a position underneath the apparatus for raising the sheets singly. An arm $C^7$ is fixed to a shaft $C^8$, mounted on the frame of the machine, and one end of said arm $C^7$ is pivotally connected to the lower end of the rod C at $C^9$, the lower portion of said rod passing through a suitable guide-box $C^{10}$.

D designates a wheel mounted on and adapted to rotate with the shaft A and having a cam-groove $D'$ about its circumference in which groove an antifriction-wheel $D^2$ travels, which latter is mounted on a stub-shaft carried by the arm $D^3$, which is fixed to and adapted to rock the shaft $C^8$, whereby at each revolution of the wheel D the mechanism for raising the sheets of tin is depressed against the upper sheet of the pile and raised to its highest throw.

In order to hold a sheet of tin which has been raised from a pile (designated in the drawings by the letter E,) in a horizontal position in readiness to be pushed forward between friction feed-rollers, whereby the sheet is fed to another part of the mechanism, we provide a rock-shaft F, which is journaled in suitable bearings $F'$, there being one of said shafts on either side of the machine, and fixed to the end of said shaft F is a bevel-gear $F^2$, which is in mesh with the bevel-gear $F^3$, journaled on a shaft $F^4$, mounted in the frame of the machine. Said shaft $F^4$ has keyed thereto an arm $F^5$, which is pivotally connected to a rod $F^6$, carrying at its lower end a stub-shaft $F^7$, on which is journaled an antifriction-wheel $F^8$, adapted to travel in a groove $F^9$ on the cam-wheel $F^{10}$, which latter is fixed to rotate with the operating-shaft A. Fixed to said rock-shaft F are two collars $F^{11}$, each of which has an integral arm $F^{12}$, the upper end of which is provided with a right-angled bracket-plate $F^{13}$, which projects at right angles from said arm $F^{12}$ a slight distance, these plates being provided for the purpose of supporting the sheets of tin by the two plates on each side of the sheets being driven toward each other sufficiently to catch under the edges of the sheet to hold the sheet while it is being pushed forward by means of the fingers $B^{17}$. By reason of the peculiar outline of the cam-groove in the wheel $F^{10}$ the parts are so operated that the said plates $F^{13}$ will have performed their office and be swung or rocked outwardly, so as to clear the path for the next sheet of tin which is raised by the mechanism which has been described.

G and $G'$ designate friction feed-rollers between which the sheet of tin is fed forward to a position upon the machine where the sheet is cut into strips of a width equal to the length of the body portion of a can. One of said rollers, G, is mounted on a shaft $G^2$, which carries a bevel-gear $G^3$, which is in mesh with a bevel gear-wheel $G^4$, which is fastened to rotate with the shaft $G^5$, mounted in suitable bearings on the frame of the machine. By means of the adjusting-screw $G^6$ the tension between the rollers G and $G'$ may be adjusted.

Mounted in bearings H in the frame of the machine is a vertically-rotating shaft $H'$, having a bevel-gear $H^2$ fixed upon its lower end, which is in mesh with a bevel gear-wheel $H^3$, mounted upon and adapted to rotate with the operating-shaft A, and at the upper end of said shaft $H'$ is secured a bevel-gear $H^4$, which is in mesh with a bevel-gear N, fixed upon the shaft M. A second gear-wheel $N^\times$, also fixed upon the shaft N, is in mesh with the gear $H^5$, secured to a shaft $H^6$, mounted in the frame of the machine. Said gear-wheel $H^5$ is in mesh with a gear $H^7$, secured to rotate with the shaft $H^8$. Said gear $H^7$ is in mesh with gear fixed to a shaft $H^{13}$, which latter has also mounted to rotate therewith a bevel-gear $H^9$. Referring to Fig. 3, it will be seen that bevel-gear $H^9$ is in mesh with bevel-gear $H^{10}$, which is fixed upon shaft $G^5$, that drives, through the gear connection, the friction feed-roller G. By this intermeshing gear mechanism just described it will be observed that motion is imparted from the main operating-shaft to the friction feed-roller G, whereby the sheets of tin are fed singly to the part of the mechanism where the sheets are cut into strips preparatory to having the tops and bottoms of the cans punched out of the ends thereof.

Referring to Fig. 2 of the drawings, I, $I'$, and $I^2$ designate three shafts which are journaled in suitable bearings adjacent to the upper marginal edges of the frame of the machine, and mounted upon and rotating with the shaft $I^2$ is a cam $I^3$, about the circumference of which a strap $I^4$ travels, which has an integral arm $I^5$, which is pivoted, by means of a pin $I^6$, to an arm $I^7$, integral with or secured to a reciprocating knife $I^8$, which is mounted to reciprocate vertically in the frame. The cutting or shearing edge of said knife is designated by letter $I^9$ and is adapted when at its lowest limit to shear with a stationary cutting-knife $I^\times$, Fig. 25, over which the sheet of tin is fed forward. A frictional feed-roller $H^\times$ is mounted upon the shaft $H^{13}$ and is adapted to rotate therewith, and a second friction-roller $H^{12}$ is mounted in a suitable adjustable boxing $H^{20}$ and adjacent to said friction-roller on shaft $H^{13}$ and between which the sheets of tin are fed immediately before being cut into strips to form the body portions of cans. Two sets of friction-rollers (designated, respectively, by letters J, $J'$, $J^2$, and $J^3$) are provided, which rollers $J'$ and $J^3$ are mounted in adjustable boxes, and the roller J is driven by a gear connection with the wheel $H^7$, while the friction-roller $J^2$ is driven by gear connection with the wheel $J^4$, which is in mesh with the roller J.

Fixed to the shaft $I^2$ is a gear-wheel K, which is in mesh with a gear-wheel $K'$, fixed to the shaft I', and said wheel K' is in turn fixed to a gear-wheel K², fixed to the shaft I and driven by gear K⁴. Fixed to a shaft K³ is a gear-wheel K⁵, which is in mesh with a gear-wheel K⁶, fastened to rotate with a sleeve V³, Fig. 15, which is mounted upon the shaft K⁷, which latter is mounted in the frame of the machine. Fixed to the shaft K⁷ is a bevel-gear K⁸, which is in mesh with a bevel-gear K⁹, which is mounted on a stub-shaft K¹⁰, carrying a gear-wheel K¹¹, which is in mesh with a gear-wheel K¹², Fig. 27, mounted on and rotating with the main operating-shaft.

Mounted on the shafts L and L', Fig. 27, are sprocket-wheels L² and L³, (one of which, L³, is shown clearly in Fig. 25,) and about said sprocket-wheels an endless chain L⁴ travels, which is provided with lugs L⁵ at intervals along said chain, said lugs being arranged in pairs for the purpose of feeding the strip of tin intermittently from one portion of the machine to another during different stages of the cutting and forming of the sheet into the body portion of the can. Fixed upon the shaft L' and fastened to rotate with the sprocket-wheel L³ is a wheel L⁶, having four recesses L⁷ cut in from the circumference and equidistant. Mounted upon the shaft M is an arm M', carrying an antifriction-wheel M² at its free end, which wheel is adapted at each rotary movement of shaft M to engage in one of said recesses L⁷ in the wheel L⁶ and impart a one-fourth rotary motion to the wheel L⁶ and also the sprocket-wheel turning therewith, whereby an intermittent motion is imparted to the sprocket-chains.

Mounted in suitable guideways O on the opposite sides of the machine are the reciprocating carriages O', each of which has bolted thereto a circular male cutting-die O², one of which is adapted to stamp the top for a can and the other the bottom, one of said cutting-dies being provided with means for cutting out central filling-apertures for the tops of the can and means being provided to suitably ornament the top and bottom by beading or other ornamentation, as well as turning the flanged edge. A female die Oˣ is positioned underneath each of the dies O², and against which the latter are adapted to force the strip of tin being stamped and cut. Pivotally connected to each carriage is an arm O³, which is integral with a strap O⁴, which travels about the circumference of the cam O⁵, which is fixed to rotate with the shaft I'.

Mounted on the opposite sides of the frame adjacent to the travel of the ends of the strips of tin and slightly in advance of the cutting-dies O² are the carriages O⁶, each of which carries a knife O⁷, which is adapted to shear with the stationary cutting-knife O¹¹ for the purpose of cutting off the waste ends of the strips after the tops and bottoms have been stamped therefrom. Each of the carriages O⁶ has pivotally connected thereto an arm O⁸, with an an integral strap O⁹ traveling about the circumference of a can O¹⁰, which is fixed to the shaft I.

P' designates levers carrying antifriction-rollers P³, which travel in cam-grooves Pˣ in the wheels P, and the lower ends of said links are fixed to the shafts P², journaled in portions of the frame, and also fixed to said shafts P² are the crimping-arms P¹², which are disposed at an angle, as illustrated in Fig. 15 of the drawings, and adapted to coöperate with the adjustable die P¹⁰, which may be raised and lowered by means of the screws P⁸ for the purpose of turning the edges of the strips preparatory to the latter being turned to form the body portion of the can.

In order to hold the strips of tin securely while they are being sheared and the tops and bottoms punched therefrom and while the ends of the strips are being crimped, I provide a rack, which is clearly illustrated in Fig. 25 of the drawings, in which cross-pieces U⁶ are secured to the rack at intervals, and said rack is mounted upon rods U¹⁰, which are held in position and allowed to reciprocate through the box U¹². The lower end of said frame has a projection U³, carrying a stub-shaft U², on which an antifriction-wheel U' is journaled, traveling about the circumference of the cam U, carried by the main operating-shaft A. As the shaft A rotates said rack is raised to the position shown in Fig. 25 of the drawings, in which a strip U⁶ is positioned adjacent to the forward edges of the cutting-dies, the shearing-blades O⁷, and the crimping members P¹², so that when the endless carrier L⁴ feeds the strips of tin U¹⁵ against the strips U⁶, at which moment by predetermined mechanism the chain stops and the dies and crimping members are actuated, said strips U⁶, holding the piece of tin while they are being operated upon, and the moment the tops and bottoms have been punched and the ends sheared and edges crimped said rack will lower by further travel upon the cam U, and the strips U⁶ will be out of the path of the piece of tin as it is being fed forward.

The strips of tin which have been severed from the sheet, the tops and bottoms being cut from the ends thereof, waste ends being sheared, and the edges crimped by the mechanism so far described, the strips are fed forward by the sprocket-chain carrier to the end of the former or arbor l, about which the crimped ends are brought together, interlocked, and clenched. Mounted on a shaft Q is a gear-wheel Q', which is driven by gear connection with the wheel K⁶, and fixed to rotate with the shaft Q are cam-wheels Q¹⁰, and Q⁴ designate rods having forked ends fitting over the shaft Q, and each carries an antifriction-roller Q⁵, adapted to travel upon the circumference of a cam Q¹⁰, (shown clearly in Figs. 20 and 27 of the drawings,) and to which rod Q⁴ is connected a collar Q⁹, which may be held at different locations by means of an adjusting-screw, and which collar is pivotally connected to the link $Q^8$, the upper end of which is pivoted in a jaw $Q^7$. Said jaws $Q^7$ are pivotally mounted on the upper end of a rod $Q^{25}$, which is provided with an antifriction-wheel $Q^{30}$ at its lower end adapted to ride on a cam $Q^{27}$. These cams are provided for the purpose of causing the rod $Q^{25}$ to first rise for the purpose of clamping a strip of tin against the former immediately before the jaws $Q^7$ are actuated by the outside cams for the purpose of turning the strip about the former to interlock the ends thereof. Referring to Figs. 2 and 27 of the drawings, after the edges of the can have been interlocked a slide $Q^{11}$, which works in suitable guideways $Q^{12}$ on the frame, is caused to be forced down by toggle-joints, so as to clench the interlocked ends of the body portion of the can by heavy pressure, the interlocked ends forming a seam being interposed between the former, which is of solid metal, and said slide. Mounted on a shaft $Q^{13}$ are two cam-wheels $Q^{14}$ and $Q^{15}$, the latter of which is adapted to actuate the member $Q^{11}$ for clenching the seams by the following mechanism: Pivoted to the slide is a link $Q^{16}$, which is pivoted to one end of the link $Q^{17}$, which latter is pivotally mounted on a fixed pin $Q^{18}$. A link $Q^{19}$, having pivotal connection with the links $Q^{16}$ and $Q^{17}$, is pivotally connected to the lever $Q^{20}$ by means of the pin $Q^{21}$. Said lever $Q^{20}$ is pivotally mounted on the pin $Q^{22}$ and carries an antifriction-roller $Q^{23}$ at one end thereof, which is actuated by the cam $Q^{15}$, whereby at each rotary movement of said cam $Q^{15}$ the slide $Q^{11}$ is forced down against the interlocked seams of the body portion of a can, which has been previously fed underneath said slide on the former. After the ends of the strip have been brought together, interlocked, and clenched, the slide $Q^{11}$ may be thrown away from the can by means of a spring connecting the link $Q^{20}$ with the frame and designated by letter $Q^{40}$, and the said body portion is fed forward on the former by means of the slide R, having arms $R'$, which extend forward and are disposed in longitudinal grooves at locations diametrically opposite in said former. The ends of said arms are bent toward each other and are adapted to engage the rear end of the body portion of a can at points diametrically opposite to feed the same from the location on the former where the body portion is turned into cylindrical form to a location where the body portions are fed forward by means of an endless carrier to another part of the apparatus where the soldering is effected. Mounted on a pin $R^2$ is a lever $R^3$, which is pivotally connected at $R^5$ to a lever $R^4$, which latter is pivotally connected to the pin $R^7$, carried by a stud $q^7$. (Shown in Fig. 5.) The lower end of said lever $R^4$ is pivotally connected at $R^8$ to the slide R, whereby at each rotary movement of the cam $Q^{14}$ the latter will contact with an antifriction-roller $R^\times$ on lever $R^3$ and cause the same to tilt, and with it a lever $R^4$, which is pivotally connected thereto. As the lever $R^4$ tilts, the slide pivotally connected to its lower end will be driven forward. A spring $R'$, connected at one end to the frame and its other end to the lever $R^3$, serves to return the links and slide to their starting positions. In order to allow a slight longitudinal movement to the levers $R^3$ and $R^4$, slots $r$ (shown in Figs. 27 and 29) are formed therein. The forward movement of said slide serves to push a can-body from the location on the former where the ends are brought together and clenched to a position to be carried forward to the soldering mechanism by means of an endless carrier, which will be presently described.

Mounted on the shafts S and $S'$ are the sprocket-wheels $S^2$ and $S^3$, respectively, upon which a chain or endless carrier $S^4$ travels, having lugs $S^5$ arranged in pairs at suitable locations to feed cans successively along the former to a location to be soldered. Fixed to rotate with said shaft S is a wheel $S^6$, having a series of segment cam-surfaces $S^7$ arranged about its circumference, each cam-surface terminating in a shoulder $S^8$, and integral with a rock-shaft $S^9$ is an arm $S^{10}$, the end of which carries an antifriction-wheel $S^{11}$, which is adapted to travel about the circumference of said wheel $S^6$. A second arm $S^\times$, integral with said rock-shaft $S^9$, has pivotal connection, as at $S^{12}$, to a rod $S^{13}$, which may be adjustably held to the lever $S^{14}$ by means of the nuts $S^{15}$, through which the rod $S^{13}$ passes. Said lever $S^{14}$ is pivoted at one end at $S^{16}$ on a bracket $S^{17}$ and passes through a solder-pump piston-rod $S^{18}$, which causes each time said lever is tilted by the antifriction-roller $S^{11}$ being raised as cam-wheel $S^6$ makes a partial revolution a stream of molten solder to be forced out through the nose $S^{19}$, at a location directly over the seam to be soldered, as shown clearly in Fig. 4 of the drawings. Within said hollow piston is a plunger $S^{20}$, which is adapted to force the solder in a manner described in our former application, Serial No. 99,298, which detail construction is not illustrated in the present application. The moment the antifriction-roll $S^{11}$ comes to a shoulder or offset $S^8$ in the wheel $S^6$ a spring $S^{25}$, which is fixed at one end to the frame and its other end bearing yieldingly against the under edge of the handle of the lever $S^{14}$, will cause the free end of said lever to be thrown up and with the lever the pump-piston will be raised, and the feeding of the solder will cease for a moment, which interval is sufficient time to allow a new can to come underneath the nozzle, and the moment the antifriction-roll $S^{11}$ begins to rise on the cam-surface $S^7$ the solder is again being fed upon the seam.

Mounted on the shaft $S'$ is a wheel T, having a series of cam-segment surfaces T' about its circumference, terminating in shoulders $T^2$, which are adapted to be engaged by an antifriction-roller $T^3$, which is mounted upon the arm $T^4$, pivoted on a pin $T^5$, carried by the frame. The upper end of said arm has pivoted thereto a forked member $T^6$, the arms of which are adapted to engage in elongated slots $T^7$ at locations diametrically opposite each other in said former adjacent to its ends. The ends of the arms of said member $T^6$ are adapted to bear against the edge of the body portion of the can and to throw the same off the end of the former onto the arm W, which is provided to transfer the body portion to another portion of the machine, (not illustrated in the present application,) where the tops and bottoms are applied to the body portions.

Referring to Fig. 15, I have shown a clutch mechanism comprising a spring-actuated pin V, which is carried by the gear-wheel $K^6$ and is adapted to be inserted in an aperture V' in the wheel $V^2$ when it is desired to have the gear-wheel $K^6$ rotate with the shaft $K^7$. By throwing said pin out of engagement with the wheel $V^2$ the gear mechanism will be at rest as the shaft $K^7$ turns loosely in the collar with which the gear-wheel $K^6$ is fastened to rotate.

In operation a pile of sheets of tin are placed upon the slide $A^4$, and when the wheel B' makes a complete revolution said slide will be fed forward to a location underneath the members which pick up the sheets singly. After a sheet of tin has been elevated by means of the members $C^3$ into a position to be fed forward between the friction-rollers G and G' the plates $F^{13}$ on each side of said sheet are thrown underneath the same to form a support therefor, and as the cam-wheel $B^{12}$ makes a rotation the arms $B^{16}$ will throw the feeding-fingers which are in contact with the rear edge of the sheet, which is held in suspension forward from the supporting-plates, and the forward edges of the sheets are caught between the friction feed-rollers G and G'. After passing between the same the forward edge of the sheet is caught between the second set of friction feed-rollers $H^\times$ and $H^{12}$, and by means of the cutting edge $I^9$, Fig. 2, said sheet is cut into strips which are of a width equal to the length of the body portion of a can to be formed. As the strips which are severed from the sheet are fed between the friction-rollers J, J', $J^2$, and $J^3$ the rear longitudinal edge of each strip is caught and fed forward by the lugs $L^5$ on the endless chain carrier $L^4$. The endless carrier $L^4$ has an intermittent motion which is imparted thereto by means of the arm M', carrying an antifriction-wheel $M^2$ at its end, which at each rotation engages in a recess $L^7$, thereby making a one-fourth rotation to the sprocket-wheel, which will allow ample time for the strip to pass while the tops and bottoms are being stamped therefrom and while the waste ends are sheared off preparatory to the strips being fed to another part of the machine, where the ends of the strips are crimped prior to their being turned about the former and clenched. As the strip approaches a position underneath the male dies $O^2$ the eccentric which actuates said dies will cause the top and bottom to be stamped from the strip of tin, as well as turning the flanges to said top and bottom. In the next onward movement of the strip as it comes underneath the shearing-knives $O^7$ the waste ends of the strip from which the top and bottom have been stamped are sheared off and the strip advances to another position underneath the crimping members $P^2$, where the ends of said strip are crimped to form interlocking ends. Before said strips are acted upon by the shearing-knives, stamping members, and crimping-dies the cam-wheel U, Fig. 25, will cause the rack supported by the rods $U^{10}$ to rise up, so that the stops $U^6$ will assume positions adjacent to the corresponding edges of the shearing-knives, the cutting-dies, and crimping members, against which stops the strips of tin contact and are held securely while being operated upon. As the strip with its ends crimped arrives at a location over the jaws $Q^7$ a longitudinal movement is imparted to the rod $Q^{25}$, which is actuated by means of a cam on the shaft Q, a sufficient distance to force the central part of the strip against the former, and when the circumferences of the cams $Q^{10}$ come in contact with the means for throwing the jaws $Q^7$ toward each other the two ends of the strip will be turned about the former and the crimped ends will interlock, after which the slide $Q^8$, which is actuated by means of the double toggle-links, will be depressed and the ends securely clenched together. After the seams are clenched together the cam $Q^{14}$ will actuate the lever $R^3$ and through the medium of the arm $R^4$ will cause the slide R to be pushed forward, and the ends of the arms $R'^\times$ with their inwardly-bent edges will force the can forward on the former to a location where the lugs $S^5$ on the endless carrier $S^4$ will convey the body portion of the can to the soldering mechanism. As the seam comes underneath the nozzle $S^{19}$, the cans being suitably heated and fluxed by any suitable means, the antifriction-wheel $S^{11}$ on the end of the lever $S^{10}$ will be drawn down and a molten stream of solder will be forced by the solder-pump over the seam, and when the rear end of the body portion of the can comes opposite the nozzle the antifriction-wheel $S^{11}$ reaches an offset or shoulder $S^8$ and the lever $S^{10}$ will tilt in the opposite direction, causing the solder-pump piston to be raised and forcing a new supply of solder into the recess below the plunger in said piston by means which is clearly illustrated in our former application before referred to, but not specifically shown or described in the present application, in readiness to discharge a new supply as the antifriction-wheel $S^{11}$ travels up the next cam-surface of the wheel $S^6$. By so timing the movements of this feature of the apparatus it will be observed that there is an intermittent feeding of the solder during the interval intervening between the passing of the rear end of the body portion of one can until the forward end of the following can reaches the nozzle. When the body portions reach the outer end of the former, the forked member $T^6$, which is actuated by the lever $T^4$, will push the body portions off from the former, and they are successively carried by the transferring-arm W to another part of the machine, where the tops and bottoms are automatically applied to the body portions of the cans, but which forms no part of the present application.

Having thus fully described our invention, what we claim as new, and desire to secure by Letters Patent, is—

1. A can-making machine comprising means for raising a sheet of tin, and automatically-operated mechanism for holding the tin suspended, and means for pushing said sheet forward to be fed to a location underneath the shearing-knife where the sheet is cut into strips, a carrier having an intermittent movement on which the strips are fed, means for stamping the tops and bottoms for the cans out of said strips, and shearing the ends of the strips, mechanism for crimping the ends of the strips, a former, and clamping-jaws designed to hold the strip with its crimped edges against the former, and turn and interlock the ends, and a slide, toggle-joint connections for clenching the seam, and means for operating the same, as set forth.

2. A can-making machine comprising means for raising a sheet of tin, supporting-plates automatically thrown underneath the sheet to support the same while it is being pushed forward to be fed to a location where the sheet is cut into strips, and means for stamping the tops and bottoms for the cans out of said strips and afterward shearing the waste ends, oscillating crimping-arms provided to turn the edges of the can, and means for turning the strip about a former and interlocking said crimped ends, a slide, toggle-joint connections for clenching the seam, and means for operating the same, as set forth.

3. A can-making machine comprising means for raising a sheet of tin, supporting-plates automatically thrown underneath the sheet to support the same while it is being pushed forward to be fed to a location where the sheet is cut into strips, and means for stamping the tops and bottoms for the cans out of said strips and afterward shearing the waste ends, means for turning the strip about a former and interlocking the crimped ends, a slide, toggle-joint connections for clenching the seam, and means for operating the same, all operated automatically, as set forth.

4. A can-making machine comprising means for raising a sheet of tin, supporting-plates thrown underneath the sheet to support the same while it is being fed forward, frictional feed-rollers for carrying the sheet forward to a location to be cut into strips by a shearing-knife, an intermittent-feeding carrier on which the strips are deposited, means for stamping the tops and bottoms out of said strips, and afterward shearing the waste ends, oscillating crimping members for turning the ends of said strips, mechanism for turning the ends about the former and interlocking and clenching the same, and a reciprocating means for feeding the body portion of a can upon the former, as set forth.

5. A can-making machine comprising means for raising a sheet of tin, movable plates which are fed underneath the sheet after being raised, and adapted to support the sheet while it is being pushed forward, a shearing-knife for cutting the sheet into strips and depositing the same upon an intermittent carrier, means for stamping tops and bottoms for the cans out of said strips and afterward shearing the waste ends, oscillating crimping members for turning the edges of said strips, clamping means for raising the strip with crimped ends against a former and bringing the edges together and interlocking the same, a reciprocating slide adapted to engage diametrically opposite portions of a can, and feed the same forward upon the former, as set forth.

6. A can-making machine comprising a carriage on which a pile of sheets of tin is adapted to be carried, and means for imparting an intermittent motion to said slide, whereby a pile of tin is fed forward, means for raising sheets of tin singly from said pile, movable supporting-plates on which the sheets are held suspended while being pushed forward to be fed to a location where the sheet is cut into strips, and means for punching the tops and bottoms for the cans out of said strips, and afterward shearing the waste ends, an intermittent carrier on which the strips are fed, oscillating crimping members for turning the edges of the strips, and means for turning the strips about a former and interlocking the edges and clenching the same, and mechanism for feeding the body portion of the can thus formed forward upon the former, as set forth.

7. A can-making machine comprising a frame, a carriage on which a pile of sheets of tin is deposited and means for imparting an intermittent movement to said slide to a location underneath the mechanism for receiving the sheets singly, movable plates which are thrown underneath the sheet which has been previously raised from the pile, oscillating arms for pushing the sheet upon said supporting-plates, to be fed forward to a location underneath a shearing-knife where the sheet is cut into strips and deposited upon an intermittent carrier, means for punching the tops and bottoms for the cans out of said strips and afterward shearing the waste ends, oscillating crimping members adapted to turn the edges of the strips, a former and means for turning the strip with crimped edges about said former and interlocking the edges and clenching the same, and feeding the body portions of the cans thus formed forward upon the former, as set forth.

8. A can-making machine comprising a frame having a table, a reciprocating carriage working thereon and adapted to carry a pile of sheets of tin, means for imparting an intermittent movement to said carriage, antifriction-wheels mounted on the table and adapted to contact with the under sheet of the pile as it is fed forward, means for raising singly sheets of tin from said pile, movable plates which are thrown under the edges of the sheet after it has been raised, an oscillating arm adapted to push the sheet, suspended by said plates forward to be fed to a location underneath the shearing-knife, means for stamping the top and bottom for the can from said strip, an intermittent carrier on which the strips are fed, means for shearing the waste ends after the tops and bottoms have been cut therefrom, oscillating members adapted to crimp the edges of the strips, and means for turning the strips about a former, interlocking the crimped ends and clenching the same, and mechanism for feeding the body portion thus formed forward upon the former, as set forth.

9. A can-making machine comprising a frame, a table, a carriage mounted thereon and adapted to hold a pile of sheets of tin, antifriction-wheels mounted in said table, means for raising singly sheets of tin from said pile, movable plates which are thrown under the edges of the sheet after it has been raised, an oscillating arm adapted to push the sheet, suspended by said plates, forward, to be fed to a location underneath the shearing-knife, an operating-shaft, a cam-wheel mounted loosely thereon, an arm pivotally mounted on a stationary pin at one end, an antifriction-wheel carried by said arm adapted to travel in a groove in said cam-wheel, link connections between said arm and said carriage, clutch mechanism adapted to throw said cam into motion with the operating-shaft, whereby said carriage will be fed forward, as set forth.

10. A can-making machine comprising a frame, a table, a reciprocating carriage mounted thereon designed to carry a pile of sheets of tin, means for imparting an intermittent movement to said carriage, and means for raising a sheet of tin from said pile, movable supporting-plates adapted to be thrown underneath the edges of the sheet, and an oscillating arm for pushing the sheet forward upon said supporting-plates to be fed forward to a location where the sheet is cut into strips, an intermittent endless carrier on which the strips are deposited, means for stamping the tops and bottoms for the cans out of said strips, and afterward shearing the waste ends, oscillating members adapted to crimp the edges of said strips, means for raising the strip with crimped edges against a former, and for turning the sheet about the same and interlocking the edges, a clenching-slide and toggle-link connections, a slide having arms which are designed to be seated in grooves at locations diametrically opposite each other in the former, and adapted to push the body portions thus formed forward upon the former, and an endless carrier for advancing the body portions of the cans to be soldered, as set forth.

11. A can-making machine comprising a means for raising sheets of tin and feeding the same forward to locations where they are cut into strips by a shearing-knife, an intermittent carrier on which the strips are fed, means for stamping the tops and bottoms from the strips, and afterward shearing the waste ends, oscillating members for crimping the edges of the strips, a former about which the strips are turned and their edges interlocked and clenched, means for pushing the body portions of the cans thus formed forward on the former, an endless carrier for conveying the body portions, and the automatic soldering device for feeding molten solder over the seams as the cans are in motion, as set forth.

12. A can-making machine comprising means for raising sheets of tin, supporting the same and feeding the same forward, a shearing-knife for cutting the sheets into strips, an intermittent endless carrier on which the strips are deposited, means for stamping the tops and bottoms for the cans out of said strips and afterward shearing the waste ends thereof, oscillating members for crimping the edges of the strips, a former, clamping means for turning the strip about the former and interlocking its ends, means for clenching its interlocked ends, and reciprocating feed mechanism for pushing the body portion of the can thus formed forward on the former, an endless carrier for conveying the cans to be soldered, a soldering mechanism, and means for automatically forcing molten solder over the seam as the body portions of the cans are fed forward on the former, as set forth.

13. A can-making machine comprising means for raising sheets of tin and holding the same suspended while being pushed forward, a shearing-knife for cutting the sheets into strips, an intermittent endless carrier on which the strips are deposited, means for stamping the tops and bottoms for the cans and afterward shearing the ends thereof, oscillating members for crimping the edges of the strips, a former, and means for clamping the strip against the former and turning the ends about the same and interlocking the edges and clenching the same, a reciprocating slide having arms adapted to feed the body portion of the can thus formed forward on the carriage, an endless carrier for continuing the movement of the body portion of the can to be soldered, soldering mechanism, means for feeding molten solder upon the seam while the can is in motion, and means for pushing off the soldered body portions from the end of the former, as set forth.

14. A can-making machine comprising means for raising a sheet of tin, movable plates for holding the sheet, an oscillating arm for pushing the sheet forward to be fed to a location where the sheet is cut into strips, an intermittent endless carrier on which the strips are fed, means for stamping tops and bottoms for the body portions of the cans out of said strips, and for shearing the waste ends and crimping the strips, while said endless carrier is at rest, and mechanism for turning the strips about the former to interlock the edges thereof, and clenching the same, as set forth.

15. A can-making machine comprising means for raising a sheet of tin, movable plates for holding the same suspended, oscillating means for pushing the sheet forward, a reciprocating shearing-knife for cutting said sheet into strips, an intermittent endless carrier on which the strips are deposited, means for simultaneously stamping the tops and bottoms out of said strips, and afterward shearing the waste ends thereof, oscillating members adapted to crimp the edges of said strips, a former, and clamping means upon which the strips are fed, and means for turning the strip about the former and interlocking and clenching the edges thereof, as set forth.

16. A can-making machine comprising means for raising a sheet of tin, movable plates for supporting the sheet, oscillating means for pushing the sheet forward, a reciprocating shearing-knife adapted to cut the sheet into strips, an intermittent endless carrier on which the strips are deposited, means for stamping the tops and bottoms for cans out of said strips, shearing-knives for cutting the waste ends of the strips, oscillating members adapted to crimp the edges of said strips, a former, means for clamping the strips against the former and automatically interlocking and clenching the edges, a reciprocating slide having a bifurcated arm, the longitudinal portions of which are disposed in diametrically opposite grooves in the former, the ends of said arms being bent toward each other and adapted to engage the rear edge of the body portion of a can and feed the same forward on the former, as set forth.

17. A can-making machine comprising a frame, means for raising sheets of tin, movable supports which are thrown under the sheet when raised, and means for pushing said sheet forward upon the supporting-plates to be fed forward to shearing means where the sheet is cut into strips, an intermittent carrier on which the strips are deposited, stamping means for cutting the tops and bottoms for the cans out of said strips, and shearing means for cutting the waste ends, oscillating crimping members pivoted adjacent to their lower ends, antifriction-wheels carried by the latter, grooved cams in which said antifriction-wheels travel whereby said crimping members may be tilted in unison, a former, means for holding the strips against and turning the same about the former and interlocking the crimped edges, clenching means, and feeding-arms for advancing on the former the body portion of the can thus formed, as set forth.

18. A machine for making cans comprising a frame, means for raising sheets of tin and feeding the same forward, a shearing-knife for cutting the sheet into strips, an intermittent endless carrier on which the strips are deposited, stamping-dies and means for reciprocating the same against the ends of said strips whereby the tops and bottoms for the cans are cut, shearing-knives for trimming the waste ends of the strips, oscillating crimping-arm, cam-wheels, and antifriction-rollers carried by said crimping-arms and actuated by said cams, a former, movable jaws for raising the strip against and turning the same about said former and interlocking the edges thereof, a sliding clenching member, double toggle-link and lever connections therewith, a cam adapted to actuate said links and lever, and means for feeding the body portion of the can forward upon the former to be soldered, as set forth.

19. A can-making machine comprising the frame, means for raising sheets of tin and feeding the same forward, a reciprocating knife for shearing the sheet into strips, an intermittent carrier on which the strips are deposited, means for stamping the tops and bottoms for the cans out of said strips, and knives for shearing the waste ends, oscillating crimping members adapted to crimp the ends of said strips, cam-wheels, antifriction-rollers carried by the arms of said crimping members and actuated by said cam, a former, movable clamping means on which the strips are singly deposited from said intermittent carrier, a cam, and means for operating the same whereby the jaws are moved to clamp the sheet against the former, and a second cam for turning the edges about the former to interlock the crimped edges thereof, a reciprocating clenching-slide, double toggle-link connections therewith, a reciprocating slide having a bifurcated arm adapted to feed the body portions of the cans on the former, a shaft with two cams thereon, one of which is adapted to actuate said clenching member, the other designed to reciprocate the bifurcated feeding-arm, as set forth.

20. A can-making machine comprising a frame, means for raising sheets of tin, and supporting the same, and feeding the same forward on its supports, a reciprocating knife for shearing the sheets into strips, an intermittent carrier on which the strips are deposited, means for cutting from said strips the tops and bottoms for the cans, and flanging the same, oscillating crimping members for turning the edges of the strips to be interlocked, movable clamping-jaws on which the strips are fed on the intermittent carrier, means for clamping the strip of tin against the former, turning the ends of the strip about the former and clenching the same, a reciprocating clenching member, double toggle-link connections therewith, a cam adapted to actuate said toggle-links, a slide having a bifurcated arm adapted to feed the body portions of the cans forward on the former, a link pivoted on a stationary pin at one end, the other end pivotally connected to said slide, and a rocking arm having pivotal connection with said link, and an antifriction-roller carried by said arm, and the cam on which said antifriction-roller travels, and means for operating said cams, as set forth.

21. A machine for making cans comprising a frame, and means for raising sheets of tin, supporting and feeding the same forward on said supports, a reciprocating shearing-knife designed to cut said sheets into strips of a width equal to the length of the body portion of a can, reciprocating carriages, die cutting-knives secured thereto, adapted to cut the tops and bottoms for the cans from said strips, an intermittent carrier on which the strips are fed, reciprocating knives for cutting the waste ends of the strips, eccentrics, and pivotal connections between the same and said reciprocating carriages or slides, gear connections for driving said eccentrics, crimping members pivoted adjacent to their ends, antifriction-rollers carried by the arms of said crimping members, cams on which said rollers travel, a former, and means for bending the strip about the same and interlocking its crimped edges and clenching the same, and means for feeding the body portion of the can thus formed forward upon the former, as set forth.

22. A can-making machine comprising means for raising sheets of tin, supporting the same, and feeding the sheets forward, a reciprocating knife for shearing the sheet into strips, an endless carrier on which the strips are fed, a rotating shaft, an arm carried thereby, an antifriction-wheel carried by said arm, which is adapted to impart an intermittent movement to said carrier, means for stamping the tops and bottoms for the cans, shearing the waste ends and afterward crimping the edges, and means for turning the strips about a former and interlocking and clenching the crimped edges of the strips, as set forth.

23. A machine for making cans comprising means for raising sheets of tin, feeding the same forward when held in a raised position, a reciprocating shearing-knife for cutting the sheet into strips, an endless-chain carrier, sprocket-wheels on which the chain is mounted, a wheel having recesses in its circumference mounted to rotate with one of said sprocket-wheels, a rotatable arm, an antifriction-wheel carried thereby, which is adapted at each revolution to engage in one of said recesses and impart an intermittent movement to said chain, and means for stamping the tops and bottoms for the can, shearing the waste ends, and crimping the edges of the strips as they are fed forward on said carrier, and means for turning the strips about a former, interlocking and clenching the edges thereof, as set forth.

24. A machine for making cans, comprising means for raising sheets of tin, movable supporting devices for holding the sheets suspended, and means for pushing the sheets forward on their supporting devices, a reciprocating knife for cutting the sheet into strips, an endless carrier comprising sprocket-wheels, a sprocket-chain mounted thereon, having lugs arranged in pairs on said links, a driving-wheel rotating with one of said sprocket-wheels and provided with radial recesses in its circumference and equidistant, a rotating arm, an antifriction-wheel carried by said arm and adapted at each rotary movement to engage in one of said recesses and impart an intermittent movement to said carrier, means for stamping the tops and bottoms for the cans from said strips and afterward shearing the waste ends and crimping the edges of the strips, preparatory to their being turned to form the body portion of the can, as set forth.

25. A can-making machine comprising means for raising the sheets of tin, holding the same in a raised position, an oscillating mechanism for pushing the plates forward, friction feeding-rollers between which the sheets are fed, a reciprocating knife for cutting the sheet into strips, friction feed-rollers arranged in pairs, between which the strips that have been cut are fed, an intermittent endless carrier having lugs arranged in pairs on the links thereof, and adapted to receive the strips for passing between said friction feed-rollers, means for stamping the tops and bottoms from said strips as they are fed forward by said carrier, reciprocating knives for cutting the waste ends of the strips, oscillating crimping members pivoted adjacent to the ends of the strips and adapted to crimp said edges, means for clamping the strips with crimped edges against a former, and turning the strips about the said former, and clenching the edges thereof, a feeding-slide having a bifurcated arm which is adapted for feeding the cans forward on the former.

26. A can-making machine comprising means for feeding sheets of tin forward to be cut into strips, from which tops and bottoms for the cans are stamped, shearing-knives for cutting the waste ends of the strips after the tops and bottoms have been cut therefrom and means for crimping and bending the strips about a former and interlocking the edges thereof, an endless carrier having lugs which are adapted to engage the rear edges of the body portions of the cans and advance the same on the former and a vertically-movable rack having lugs thereon which form stops to hold the strips while the tops and bottoms are being stamped and the edges crimped, and means for soldering the clenched seams as they are fed underneath the soldering mechanism, as set forth.

27. A can-making machine comprising means for feeding sheets of tin forward and cutting the same into strips, an intermittent carrier on which the strips are fed, means for stamping the tops and bottoms for the cans out of said strips and shearing the waste ends and afterward crimping the edges, while the strips are on said carrier, and at rest, means for turning the strips about a former, interlocking and clenching the edges, a reciprocating plate having arms adapted to feed the body portions of the cans thus formed forward upon the former, an endless carrier adapted to receive the cans from said reciprocating carrier, and soldering means whereby a stream of molten solder is fed against the interlocked seam as it is fed by said endless carrier forward upon the former, as set forth.

28. A can-making machine comprising means for feeding sheets of tin forward into the machine and cutting the same into strips of a width equal to the length of the body portion of a can, an intermittent carrier on which the strips are fed forward, means for stamping the tops and bottoms for the cans from said strips and shearing the waste ends, crimping members for turning the edges of said strips, means for turning the strips about a former and interlocking and clenching the edges, an endless carrier, and means for pushing the body portion of the can after the edges have been clenched, onto said endless carrier, a solder-pump and solder-feeding nozzle and means for operating the piston of the pump to force the molten solder over the seam of the body portion of a can, and means for shutting off the feeding of the solder after the end of the can passes said nozzle, as set forth.

29. In a can-making machine, the combination with a mechanism for intermittently feeding sheets of tin to positions to be prepared for making the body portions of cans, of a vertically-movable rack, horizontally-disposed strips forming a portion of said rack, and means for moving said rack so that said strips will be thrown in advance of the sheets of tin, as the intermittent carrier comes to rest, for the purpose of steadying the sheets while the ends are being sheared from said sheets, and the tops and bottoms punched therefrom, as set forth.

30. In a can-making machine, the combination with mechanism for intermittently feeding sheets of tin into positions to be prepared for forming the body portions of cans, of reciprocating rods mounted in suitable bearings in the frame of the machine, a rack supported by said rods, strips forming a portion of said rack, a cross-piece fastened to the lower ends of said rods, a cam-wheel for raising and lowering said cross-piece, said rack being adapted to be actuated so that the strips thereon will be positioned in advance of the sheets of tin as the sheet-feeding mechanism comes to a rest, and provided for the purpose of steadying the sheets as the tops and bottoms are punched therefrom, and the ends of the sheets crimped, as set forth.

In testimony whereof we affix our signatures in presence of two witnesses.

JOHN G. REHFUSS.
MARTIN O. REHFUSS.

Witnesses:
HENRY PENNINGTON,
J. B. JARDELLA.